United States Patent
Santoro et al.

(10) Patent No.: US 7,660,039 B2
(45) Date of Patent: Feb. 9, 2010

(54) LIGHT CONTROL DEVICES AND METHODS IMPLEMENTED WITH KINOFORM DIFFUSERS HAVING CONTROLLABLE DIFFUSION CHARACTERISTICS

(75) Inventors: Scott Santoro, Delta (CA); Melissa Crenshaw, Bowen Island (CA); Ian Ashdown, West Vancouver (CA)

(73) Assignee: Ledalite Architectural Products Inc., Langley, British Columbia (CA)

(*) Notice: Subject to any disclaimer, the term of this patent is extended or adjusted under 35 U.S.C. 154(b) by 0 days.

(21) Appl. No.: 09/907,536

(22) Filed: Jul. 16, 2001

(65) Prior Publication Data

US 2002/0034012 A1 Mar. 21, 2002

Related U.S. Application Data

(60) Provisional application No. 60/294,423, filed on May 29, 2001, provisional application No. 60/218,224, filed on Jul. 14, 2000.

(51) Int. Cl.
G02B 5/02 (2006.01)
G02B 5/32 (2006.01)

(52) U.S. Cl. ......................... 359/599; 359/15

(58) Field of Classification Search ............ 359/15, 359/22, 16, 599, 1, 28, 569; 349/64, 112; 345/173; 362/333; 385/146
See application file for complete search history.

(56) References Cited

U.S. PATENT DOCUMENTS

| | | | |
|---|---|---|---|
| 3,619,021 A | 11/1971 | Biedermann et al. | 359/17 |
| 3,698,810 A | 10/1972 | Bestenreiner et al. | 355/71 |
| 3,708,217 A | 1/1973 | McMahon | 359/15 |
| 3,735,124 A * | 5/1973 | Stahlhut | 362/333 |
| 3,829,680 A * | 8/1974 | Jones | 362/330 |
| 4,336,978 A | 6/1982 | Suzuki | 359/569 |
| 4,427,265 A | 1/1984 | Suzuki et al. | 359/15 |
| 4,602,843 A | 7/1986 | Glaser-Inbari | 359/1 |
| 4,610,499 A | 9/1986 | Chern et al. | 350/3.7 |
| 4,704,666 A | 11/1987 | Davis | 362/296 |
| 4,713,738 A | 12/1987 | Davis | 362/296 |
| 4,960,314 A | 10/1990 | Smith et al. | 359/15 |
| 5,009,484 A | 4/1991 | Gerritsen | 359/569 |
| 5,048,925 A | 9/1991 | Gerritsen et al. | 359/569 |

(Continued)

FOREIGN PATENT DOCUMENTS

JP 10319873 12/1998

(Continued)

OTHER PUBLICATIONS

Bartolini, R.A. 1974. "Characteristics of Relief Phase Holograms Recorded in Photoresists," *Applied Optics* 18(1):129-139.

(Continued)

*Primary Examiner*—Audrey Y Chang
(74) *Attorney, Agent, or Firm*—Stoel Rives LLP-PDX

(57) ABSTRACT

Kinoform diffusers (82) exhibit controllable diffusion characteristics that include off-axis transmittance and reflectance properties, elimination of zero-order beam, and freedom from spectral dispersion under achromatic illumination. Light control devices (76, 80, 82) implemented with kinoform diffusers having controllable diffusion characteristics provide anisotropic luminous intensity distributions and glare control at high viewing angles while maintaining high luminaire efficiency or daylight utilization.

11 Claims, 16 Drawing Sheets

U.S. PATENT DOCUMENTS

| | | | | |
|---|---|---|---|---|
| 5,303,322 | A | * | 4/1994 | Winston et al. ............ 385/146 |
| 5,365,354 | A | | 11/1994 | Jannson et al. ............... 359/15 |
| 5,471,327 | A | | 11/1995 | Tedesco ...................... 359/15 |
| 5,473,516 | A | | 12/1995 | Van Order et al. ......... 362/83.1 |
| 5,534,386 | A | | 7/1996 | Petersen et al. ............ 430/320 |
| 5,582,474 | A | | 12/1996 | Van Order et al. ........... 362/74 |
| 5,609,939 | A | | 3/1997 | Petersen et al. ............ 428/141 |
| 5,631,754 | A | * | 5/1997 | Jannson et al. ............... 349/64 |
| 5,696,630 | A | * | 12/1997 | Hayashi ..................... 359/599 |
| 5,701,015 | A | | 12/1997 | Lungershausen et al. . 250/495.1 |
| 5,808,759 | A | | 9/1998 | Okamori et al. .............. 359/15 |
| 5,816,681 | A | | 10/1998 | Tedesco ....................... 362/80 |
| 5,861,990 | A | | 1/1999 | Tedesco ..................... 359/599 |
| 5,880,861 | A | | 3/1999 | Nishida ........................ 359/15 |
| 5,956,106 | A | | 9/1999 | Petersen et al. .............. 349/64 |
| 6,158,245 | A | | 12/2000 | Savant ........................ 65/17.2 |
| 6,159,398 | A | | 12/2000 | Savant et al. ................. 264/2.5 |
| 6,166,389 | A | | 12/2000 | Shie et al. .................... 250/504 |
| 6,275,219 | B1 | * | 8/2001 | Isenman ..................... 345/173 |
| 6,424,395 | B1 | * | 7/2002 | Sato et al. ................... 349/112 |
| 2007/0268585 | A1 | * | 11/2007 | Santoro et al. ............. 359/599 |

FOREIGN PATENT DOCUMENTS

| | | |
|---|---|---|
| WO | WO 96/30697 | 10/1996 |
| WO | WO 97/14982 | 4/1997 |
| WO | WO 99/06873 | 2/1999 |
| WO | WO 00/10797 | 3/2000 |
| WO | WO 00/10929 | 3/2000 |
| WO | WO 00/11522 | 3/2000 |

OTHER PUBLICATIONS

Bartolini, R. 1977. "Photoresists," *Holographic Recording Materials*, H. M. Smith, Ed. Berlin, Germany: Springer-Verlag.

Bräuer, R., F. Wyrowski, and O. Bryngdahl. 1991. "Diffusers in Digital Holography," *J. Optical Society of America* 8(3):572-578 (March).

Caulfield, H. J. 1971. "Kinoform Diffusers," *Developments in Holography*, SPIE vol. 25, pp. 111-113.

Dallas, W. J. 1973. "Deterministic Diffusers for Holography," *Applied Optics* 12(6):1179-1187 (June).

Dengler, J. J., and V. Wittwer. 1994. "Glazings with Granular Aerogel," *Optical Materials Technology for Energy Efficiency and Solar Energy Conversion XIII*, SPIE vol. 2255, pp. 718-727.

Denisyuk, Y. N., V. V. Orlov, and J. B. Brui. 1998. "One-Dimensional Diffuse Screen for 3-D Image Projection," *Practical Holography XII*, SPIE vol. 3293, pp. 78-82.

Gerritsen, H. J. 1993. "Diffractive Daylighting: Ways to Obtain Wide Angular Range, Large Efficiency, Near Achromatic Operation," *Optical Materials Technology for Energy Efficiency and Solar Energy Conversion XII*, SPIE vol. 2017, pp. 377-388.

Gray, P. F. 1978. "A Method for Forming Optical Diffusers of Simple Known Statistical Properties," *Optica Acta* 25(8):765-775.

Lesem, B, and P. M. Hirsch. 1968. "Computer Synthesis of Holograms for 3-D Display," *Communications of the ACM* 11(10:661-674).

Lesem, B, and P. M. Hirsch, and J. A. Jordan, Jr. 1969. "The Kinoform: A New Wavefront Reconstruction Device," *IBM J. Research and Development* 13:150-155.

Leskova, T. A., A. A. Maradudin, E. R. Mendez, and I Simonsen, 2000. "Band-Limited Uniform Diffuser in Transmission," *Scattering and Surface Roughness III*, SPIE vol. 4100, pp. 113-123.

Ling, D., L. Naiguang, X. Ping, Y. Shi, and Y. Li. 1996. "Holographic Diffuser to Definite Direction," vol. 2866, *International Conference on Holography and Optical Information Processing* (ICHOIP '96), pp. 398-400.

Maradudin, A. A., and I. Simonsen. 1999. "Random Surfaces that Suppress Single Scattering," *Optical Letters* 24(18):1257-1259.

Mendoza, E. A., D. Mintzer, P. Low, and A. Menon. 1997. "A Novel Material Used for Light Shaping Diffusers," SPIE vol. 3136, pp. 114-117.

Sincerbox, G. T. 1986. "Light Diffuser with Controlled Divergence," *IBM Technical Disclosure Bulletin* 29(1):276-279 (June).

Tholl, H. D., R. Kubiza, and C. G. Stojanoff. 1994. "Stacked Volume Holograms as Light Directing Elements," *Optical Materials Technology for Energy Efficiency and Solar Energy Conversion XIII*, SPIE vol. 2255, pp. 486-498.

Umstatter, H. L. and J. D. Trolinger. 1986. "Development of a High-Grain, Holographic Grating Projection Screen," *Ultraprecision Machining and Automated Fabrication of Optics*, SPIE vol. 676, pp. 17-23.

Wadle, S., D. Wuest, J. Cantalupo, and R. S. Lakes. 1994. "Holographic Diffusers," *Optical Engineering* 33(1):213-218.

Brian H. Cumpston, Sundaravel P. Ananthavel, Stephen Barlow, et al., "Two-photon polymerization initiators for three-dimensional optical data storage and microfabrication," *Nature*, vol. 398, pp. 51-54 (Mar. 1999).

Shoji Maruo, Osamu Nakamura, and Satoshi Kawata, "Three-dimensional microfabrication with two-photon-absorbed photopolymerization," *Optics Letters*, vol. 22, No. 2, 132-134 (Jan. 1997).

Péter Galajda and Pál Ormos, "Complex micromachines produced and driven by light," *Applied Physics Letters*, vol. 78, No. 2, pp. 249-251 (Jan. 2001).

Akito Iwamoto, "Artificial diffuser for Fourier transform hologram recording," *Applied Optics*, vol. 19, No. 2, pp. 215-221 (Jan. 1980).

Yoshikazu Nakayama and Makoto Kato, "Diffuser with pseudorandom phase sequence," *J. Opt. Soc. Am.*, vol. 69, No. 10, pp. 1367-1372 (Oct. 1979).

C. N. Kurtz, "Transmittance Characteristics of Surface Diffusers and the Design of Nearly Band-Limited Binary Diffusers," *J. Opt. Soc. Am*, vol. 62, No. 8, pp. 982-989 (Aug. 1972).

Marek Kowalczyk, "Spectral and imaging properties and diffusers," *J. Opt. Soc. Am.*, vol. 1, No. 2, pp. 192-200 (Feb. 1984).

C. N. Kurtz, H. O. Hoadley, and J. J. DePalma, "Design and synthesis of random phase diffusers," *J. Opt. Soc. Am.*, vol. 63, No. 9, pp. 1080-1092 (Sep. 1973).

B. S. Thornton, "Limit of the moth's eye principle and other impedance-matching corrugations for solar-absorber design," *J. Opt. Soc. Am.*, vol. 65, No. 3, pp. 267-270 (Mar. 1975).

S. J. Wilson and M. C. Hutley, "The optical properties of 'moth eye' antireflection surfaces," *Optical Acta*, vol. 29, No. 7, pp. 993-1009 (1982).

J.C. Dainty, "The Statistics of Speckle Patterns," *Progress in Optics*, E. Wolf, ed., vol. XIV, pp. 1-46 (1976).

Hoang Yan Lin, Wann-Diiang Tyan, and Ying-Tsung Lu, High-gain, wide-viewing-angle and null-hot-spot optical diffuser useful for display screen application, *SPIE*, vol. 2892, pp. 64-71, Sep. 1996.

* cited by examiner

——— 0 degrees vertical plane

- - - 90 degrees vertical plane

— 0 degree vertical plane
- - - 45 degree vertical plane
- - - - - 90 degree vertical plane ——— 0 degree vertical plane – – – 45 degree vertical plane

- - - - 90 degree vertical plane

——— 0 degree vertical plane
— — — 45 degree vertical plane
- - - - - 90 degree vertical plane

LIGHT CONTROL DEVICES AND METHODS IMPLEMENTED WITH KINOFORM DIFFUSERS HAVING CONTROLLABLE DIFFUSION CHARACTERISTICS

RELATED APPLICATIONS

This application claims priority from U.S. Provisional Patent Application Nos. 60/294,423 and 60/218,224, filed May 29, 2001 and Jul. 14, 2000, respectively.

FIELD OF THE INVENTION

The present invention pertains to the fabrication of kinoform diffusers having controllable diffusion characteristics that include predetermined and desirable physical properties relating to diffusion of achromatic illumination. More particularly, light control devices used for artificial illumination and daylighting, including residential, commercial, industrial, and roadway lighting applications are implemented with kinoform diffusers of a type exhibiting controllable diffusion characteristics to provide anisotropic luminous intensity distributions and glare control at high viewing angles while maintaining good luminaire efficiency or daylight utilization.

BACKGROUND OF THE INVENTION

Diffusers scatter incident electromagnetic radiation (e.g., visible light, infrared, and ultraviolet radiation) by means of diffuse transmission or reflectance. Considered as components of imaging and non-imaging optical systems design, an ideal diffuser would exhibit the following physical characteristics:

1. Scattering within a specified beam distribution. When a ray of collimated (but not necessarily coherent) light is incident upon a diffuser at an angle $\theta(i)$, the transmitted or reflected light would be randomly scattered through a range of angles between $\theta(t1)$ and $\theta(t2)$ for transmitted light or $\theta(r1)$ and $\theta(r2)$ for reflected light. These angles are shown in FIG. 1 and represent the limits of the transmitted or reflected beam distribution pattern. FIG. 1 is a schematic illustration of the scattering of incident beams of collimated light by prior art transmissive and reflective diffusers. Collimated light beam 10 is perpendicular to the surface of a conventional transmissive diffuser 12 and is scattered into a beam distribution 14. The beam distribution maximum is perpendicular to the surface of diffuser 12. A collimated light beam 16 is incident to a surface normal n of conventional diffuser 12 at an angle $\theta(i)$ and is scattered into a beam distribution 18. The beam distribution maximum (the "central axis" of the beam distribution) is inclined at an angle $\theta(t)$ relative to surface normal n of diffuser 12 and is equal to angle $\theta(i)$.

A collimated light beam 20 is perpendicular to the surface of a conventional reflective diffuser 22 and is scattered into a beam distribution 24. The beam distribution maximum is perpendicular to the surface of diffuser 22. A collimated light beam 26 is incident to a surface normal n of conventional diffuser 22 at an angle $\theta(i)$ and is scattered into a beam distribution 28. The beam distribution maximum is inclined at an angle $\theta(r)$ relative to surface normal n of diffuser 22 and is equal to angle $\theta(i)$.

2. No scattering outside of the specified beam distribution. No incident light would be scattered outside of the specified beam distribution ranges.

3. Uniform beam distribution. The incident light would be uniformly scattered within the specified beam distribution.

4. No backscatter. If the diffuser transmits rather than reflects incident light, none of the incident light would be reflected by the diffuser.

5. No absorption. None of the incident light would be absorbed by a transmissive diffuser.

6. Complete diffusion. It would not be possible to see an image of the light source or "hot spot" when looking at the light source through a transmissive diffuser. The diffuser would appear to have a constant luminance ("photometric brightness") distribution across its surface.

7. Wavelength independence. The scattering properties of the diffuser would be independent of the wavelength of the incident light over a specified range of wavelengths.

For the purposes of optical systems design flexibility, two additional physical characteristics would sometimes be desirable:

8. Anisotropic beam distribution. The beam distribution of the diffuser would be anisotropic about the central beam axis, including distributions that are elliptical or linear, as shown in FIG. 2. FIG. 2 is a schematic illustration of the cross-sections of the scattered light beam distributions from a prior art isotropic (circular) diffuser 30, elliptical anisotropic diffuser 32, and substantially linear anisotropic diffuser 34.

9. Off-axis beam distribution. The central axis of the beam distribution would be at a transmitted angle, $\theta(t)$ or $\theta(t')$, as shown in FIGS. 3A and 3B, respectively, that is not equal to the incidence angle, $\theta(i)$, as might be predicted by Snell's Law. The beam distribution also varies depending on the pattern orientation. In particular, batwing distributions (FIGS. 8C and 8D) are achievable with the pattern facing the light source. Similarly, the central axis of the beam distribution would be at a reflected angle, $\theta(r)$, as shown in FIG. 4, that is not equal to the incidence angle, $\theta(i)$, as might be predicted by the law of reflection from specular surfaces. FIG. 4 is a schematic illustration of an off-axis beam distribution for a reflective kinoform diffuser designed in accordance with the invention. A collimated beam 42 is incident to a surface with normal n of a reflective kinoform diffuser 44 at an angle $\theta(i)$ and is scattered into a beam distribution 46. The beam distribution maximum is at an angle $\theta(r)$ to surface normal n of kinoform diffuser 44, where angle $\theta(r)$ is generally not equal to angle $\theta(i)$ Kinoform diffusers may exhibit certain physical characteristics that approach those of an ideal diffuser.

Lesem, L. B., Hirsch, P. M., and Jordan, Jr., J. A., "The Kinoform: A New Wavefront Reconstruction Device," IBM J. Research and Development, 13:150-55(1969) introduced a "kinoform," describing it as a computer-generated "wavefront reconstruction device" that, similar to a hologram, provides the display of a three-dimensional image. Unlike a hologram, however, the kinoform yields a single diffraction order in which all of the incident light is used to reconstruct the image. A kinoform operates only on the phase of an incident wave, because it is assumed that only the phase information in a scattered wavefront is required for the construction of an image of the scattering object. The amplitude of the wavefront in the kinoform plane is assumed to be constant.

Caulfield, H. J., "Kinoform Diffusers," SPIE Vol. 25, Developments in Holography, 111-13 (1971) stated that a kinoform of a "scattering object" constituting a conventional diffuser, such as ground glass, could be generated by photographic techniques, thereby producing a "kinoform diffuser." U.S. Pat. No. 3,619,021 of Biedermann et al. describes a technique for constructing a kinoform diffuser, which is called in their patent simply a "diffusing layer."

FIG. 5 shows a basic prior art optical setup used to record kinoform diffusers as taught by Caulfield. (As will be appreciated by those skilled in the holographic arts, many variations in the optical setup are possible.) A laser 48 produces a beam of coherent light 50 that is expanded by lenses 52 and 54 to fully and evenly illuminate a diffuser 60 with a coherent planar wavefront propagating through an opaque mask 56 having an aperture 58. A photosensitive recording plate 62 is located a distance, d, behind diffuser 60. (Suitable photosensitive materials include positive and negative photoresist emulsions, silver halide films, dichromated gelatin, and various photopolymers.)

The light scattered by diffuser 60 produces on a surface of photosensitive recording plate 62 a random laser speckle pattern that is recorded photographically. Photosensitive plate 62 is developed in accordance with known processing techniques to produce a transparent substrate with a surface relief pattern whose spatially distributed height distribution is proportional to the spatially distributed intensity of the recorded laser speckle pattern, which is shown in FIG. 6. This is the transmissive kinoform diffuser. A reflective kinoform diffuser can be fabricated by, for example, applying an evaporated metal film to the surface of the transmissive diffuser. Alternatively, the surface relief pattern can be transferred using known replication techniques such as embossing or molding to an opaque metallic or plastic substrate.

When the transmissive kinoform diffuser is illuminated by a coherent planar wavefront, the length of the optical path through the diffuser at any point is determined by the height of the surface relief pattern at that point. Because the phase retardation of the wavefront propagating through the diffuser is dependent on the optical path length, the planar wavefront is randomly scattered according to the surface relief pattern of the kinoform diffuser. In theory, the kinoform diffuser reconstructs the laser speckle pattern generated by ground glass diffuser 60.

The same principle applies to reflective kinoform diffusers, except that the differences in optical path length and subsequent phase retardation occur in free air or other optically transparent medium immediately above the diffuser surface.

The Caulfield publication and certain other references noted the following observations:

1. The beam distribution of the kinoform diffuser is dependent on the distance, d, between diffuser 60 and recording plate 62. Increasing d decreases the range of angles $\theta(t1)$ to $\theta(t2)$, between which substantial diffusion occurs.

2. The angular intensity distribution of scattering is highly nonuniform, as shown in FIG. 7. Dainty, J. C., "The Statistics of Speckle Patterns," *Progress in Optics XIV*, E. Wolf, (ed.), New York, N.Y.: North-Holland, 346 (1976) sets forth the following expression demonstrating that the expected beam distribution can be characterized by a negative exponential function:

$$I_\theta = A^* \exp(-B^* I_0), \quad (1)$$

where $I_\theta$ is the expected intensity at angle $\theta$ from the axis of the incident ray, $I_0$ is the incident ray intensity, and A and B are positive constants.

3. Tilting diffuser 60 or recording plate 62 about an axis perpendicular to the laser beam axis produces kinoform diffusers with anisotropic beam distributions that are approximately elliptical, as shown in FIG. 2. Wadle S., Wuest, D., Cantalupo, J., et al., "Holographic Diffusers," *Optical Engineering,* 33(1):213-18 (January 1994) stated that the equivalent effect can be achieved by using a rectangular aperture in opaque mask 56, and U.S. Pat. No. 3,698,810 of Bestenreiner et al. described the use of one narrow slit aperture or multiple narrow slit apertures to produce substantially linear beam distributions.

4. Gray, P. F., "A Method for Forming Optical Diffusers of Simple Known Statistical Properties," *Optica Acta* 25(8): 765-775, noted that the expected beam distribution of kinoform diffusers produced using N multiple exposures with uncorrelated laser speckle patterns can be characterized by the function:

$$P = (I^{N-1}/(N-1)!)^* \exp(-N^* I). \quad (2)$$

This function tends towards a substantially Gaussian function as the number of exposures N increases, as shown in FIG. 9.

The Lesem et al. publication noted that while there is only one image (i.e., diffraction order) formed in the laser speckle pattern reconstruction, there might be a "zero-order beam" component representing a portion of the undiffracted planar wavefront. Visually, the light source illuminating a kinoform diffuser can be seen when it is viewed directly through the diffuser, indicating incomplete diffusion. This blurred image can theoretically be eliminated by perfect phase matching within the kinoform.

The Caulfield publication demonstrated that elimination of the zero-order beam (and hence complete diffusion) could be achieved experimentally by adjusting the exposure of the photosensitive plate such that the transmitted beam was not visible through the kinoform diffuser. However, this applied only to monochromatic light sources. Kowalczyk, M., "Spectral and Imaging Properties of Uniform Diffusers," *J. Optical Society of America,* A1(2):192-200 (February 1984) performed a theoretical analysis of kinoform diffusers and demonstrated that phase matching is wavelength-dependent. That is, the zero-order beam component can (in theory) be eliminated for monochromatic illumination only. When illuminated by an achromatic (or "white") light source, these diffusers may exhibit significant spectral dispersion that appears as color bands surrounding the light source image that will be visible through the diffuser.

Although they were originally developed for holographic recording and reconstruction purposes, kinoform diffusers also effectively scatter quasi-monochromatic and polychromatic light, such as that produced by light-emitting diodes, and substantially achromatic light, such as daylight and artificial light produced by incandescent, fluorescent, and high intensity discharge lamps. Examples of such uses are given in U.S. Pat. No. 4,602,843 of Glaser-Inbari, U.S. Pat. No. 5,473,516 of Van Order et al., U.S. Pat. No. 5,534,386 of Petersen et al., and U.S. Pat. No. 5,701,015 of Lungershausen et al.

Kinoform diffusers for achromatic light applications of a type known as "surface-relief holographic diffusers" are commercially available. For example, Physical Optics Corporation (Torrance, Calif.) manufactures a series of products called "Light Shaping Diffusers." These diffusers may exhibit substantial elimination of the zero-order beam with achromatic light sources. That is, they are wavelength-independent across the visible spectrum. As taught by Gray, this can be achieved by exposing the photosensitive plate to a multiplicity of uncorrelated laser speckle patterns.

A disadvantage of surface-relief holographic diffusers is that their surface relief height distributions are (within the limits of known photographic recording techniques and replication technologies) directly proportional to the intensity distributions of the recorded laser speckle patterns. As shown theoretically by Dainty and experimentally by Gray, their beam distributions are necessarily characterized by substantially Gaussian functions.

A properly designed kinoform diffuser may, therefore, exhibit the following generally desirable physical characteristics:

1. Scattering within a specified beam distribution. The range of angles within which substantial scattering occurs may be controlled by varying the distance, d, between diffuser 60 and recording plate 62 (FIG. 5).

2. Minimal backscatter. Backscatter may occur substantially only by reflection from the surfaces of a transmissive kinoform diffuser and may be substantially eliminated by the application of suitable antireflection coatings to said surfaces.

3. Minimal absorption. Incident light is absorbed substantially only within the transparent substrate of a transmissive kinoform diffuser.

4. Anisotropic beam distribution. The eccentricity of an elliptical beam distribution may be determined by the ratio of length to width of rectangular aperture 58 in opaque mask 56 (FIG. 5).

5. Complete diffusion. When it is purposefully designed to provide substantial elimination of the zero-order beam with achromatic light sources, the kinoform diffuser exhibits substantially complete diffusion of the incident light and freedom from spectral dispersion.

Unfortunately, a kinoform diffuser may also exhibit the following generally undesirable physical characteristics:

1. Significant scattering outside of the specified beam distribution. Because the expected beam distribution is characterized by a negative exponential or substantially Gaussian function, prior art techniques do not limit the scattering of the incident light to be fully within a specified range of angles.

2. Non-uniform beam distribution. A kinoform diffuser constructed using prior art techniques exhibits within the specified range of angles an expected beam distribution that is necessarily of a nonuniform negative exponential or substantially Gaussian shape. Kurtz, C. N., "Transmittance Characteristics of Surface Diffusers and the Design of Nearly Band-Limited Binary Diffusers," *J. Optical Society of America* 62(8):982-989 (August 1972) and others show that kinoform diffusers with uniform beam distributions are theoretically possible, but provide no guidance in how they might be physically realized.

One preferred use of the kinoform diffusers of the present invention is their implementation in luminaires. Luminaires (also known as "light fixtures") intended for general illumination applications are designed with the objectives of providing specific luminous intensity distributions while minimizing glare at high viewing angles and light losses within the luminaire housing. Designing luminaires to meet these objectives can be challenging, particularly when there are restraints on the physical size of the luminaire.

The luminous intensity distribution is determined by the placement and optical properties of lamps and light control components such as reflectors, refractors, diffusers, and shields (including louvers and baffles). There are many applications in which anisotropic luminous intensity distributions are used. For example, indirect fluorescent luminaires intended for office lighting typically require so-called "batwing" distributions (FIGS. 13A-13C) that provide even illumination of the ceiling (Illuminating Engineering Society of North America (IESNA) [2000]). The light control components are designed to redirect or absorb the light emitted by the lamps to achieve the desired luminous intensity distribution.

A disadvantage of light control components is that they absorb light and thereby reduce the luminaire efficiency. American National Standards Institute (ANSI)/IESNA [1996] defines luminaire efficiency as: "The ratio of the luminous flux (lumens) emitted by a luminaire to that emitted by the lamp or lamps used therein.") Tradeoffs are, therefore, made by a designer between the need to achieve specific luminous intensity distributions and minimum acceptable luminaire efficiencies.

Another aspect of luminaire design is the minimization of glare at high viewing angles (FIG. 14). (ANSI/IESNA [1996] defines glare as: "The sensation produced by luminances within the visual field of view that are sufficiently greater than the luminance to which the eyes are adapted to cause annoyance, discomfort, or loss in visual performance or visibility.") For example, ceiling-mounted office luminaires 70 should direct most of their emitted light downward to the work plane 72. If they emit too much light horizontally, they will appear distractingly bright when viewed directly. Worse, their veiling reflections from computer monitor screens may reduce office productivity.

Glare can be minimized by blocking the emitted light with shields. However, this increases the light losses within the luminaire housing and so reduces the luminaire efficiency. These losses can be reduced by using reflectors or refractors instead of shields, but this approach may limit a designer's ability to achieve specific luminous intensity distributions.

Glare can also be minimized using glass or plastic diffusers. These are preferable to shields in that the light is emitted from a larger surface area (that is, the diffuser instead of the lamp) and so reduces the maximum luminance of the luminaire (IESNA [2000]). However, these diffusers typically absorb as much as one-half of the incident light, thereby reducing the luminaire efficiency. They also emit light in all directions within the hemisphere above their surfaces, thereby further limiting a designer's ability to achieve specific luminous intensity distributions.

In the related field of daylighting, light control devices such as shields and diffusers are often used to control sunlight entering a building through windows and skylights. Diffusers such as frosted glass and plastic panels are used to limit glare and reduce dark shadows, while light control devices such as louvers, mirrors, and motor-driven heliostats may be used to control and redirect sunlight through windows and skylights. As with luminaires, however, diffusers absorb a considerable portion of the incident sunlight and offer little control over the distribution of the diffused light.

There have been numerous prior attempts to control the luminous intensity distribution of luminaires and light sources using diffractive volume holograms and commercial holographic diffusers (which have similar optical performance characteristics to those of kinoform diffusers).

Davis (U.S. Pat. Nos. 4,536,833, 4,704,666, 4,713,738, and 4,722,037) described the use of multi-layered holograms as light control elements. Unlike kinoform diffusers, multilayer holograms do not provide controllable diffusion or exhibit off-axis transmission properties, which are features of the present invention. They also function usefully as light control elements only for predetermined wavelengths. When used with achromatic light sources such as are commonly used for general illumination applications, multi-layer holograms exhibit unacceptable spectral dispersion effects (visible as color "fringes") and high absorption characteristics.

Jannson et al. (U.S. Pat. No. 5,365,354) described various applications of volume holographic diffusers that involve luminaires designed for general illumination applications. However, these applications rely solely on the well-known anisotropic diffusion capabilities of commercial holographic diffusers.

Petersen et al. (U.S. Pat. No. 5,534,386) similarly described various applications of surface-relief holographic diffusers that involve luminaires designed for general illumination applications. These applications also rely solely on the anisotropic diffusion capabilities of holographic diffusers.

Van Order et al. (U.S. Pat. Nos. 5,473,516 and 5,582,474) described a vehicle light assembly that utilizes a holographic diffuser with circular or elliptical luminous intensity distribution characteristics. This vehicle light assembly requires that the light emitted from the lamp be substantially collimated by a reflector to effectively illuminate the holographic diffuser.

Fox (U.S. Pat. No. 5,630,661) described a metal arc flashlight that optionally includes a holographic diffuser. This flashlight also requires that the light emitted from the lamp be substantially collimated by a reflector to effectively illuminate the holographic diffuser.

Smith (U.S. Pat. No. 5,669,693) described an automotive tail lamp assembly that utilizes a holographic element to diffract light emitted by a light-emitting diode assembly in a preferred direction. This tail lamp assembly relies on the quasi-monochromatic emission of light-emitting diodes, and is not suitable for use with achromatic light sources such as incandescent or high-intensity discharge lamps.

Lungershausen et al. (U.S. Pat. No. 5,701,015) described an infrared illumination system for digital cameras that utilizes a holographic diffuser to homogenize the light emitted by infrared laser diodes. This illumination system requires that the emitted light be substantially collimated to effectively illuminate the holographic diffuser.

Hewitt (U.S. Pat. No. 6,062,710) described various luminaire designs that utilize holographic diffusers to reduce glare. Unlike the present invention, these designs are predicated on the use of imaging optical elements to substantially collimate the light that illuminates the holographic diffuser.

Shie et al. (WIPO International Publication Number WO 00/11498) described various applications of holographic diffusers that involve luminaires designed for general illumination applications. These applications are based on the process of molding surface-relief diffusers directly onto the surface of transparent optical elements using injection molding or casting. The described applications rely solely on the anisotropic diffusion capabilities of holographic diffusers and some mechanically produced diffusion patterns.

Shie et al. (WIPO International Publication Number WO 00/11522) further described various applications of holographic diffusers that involve luminaires designed for general illumination applications. These applications are based on the process of embossing surface-relief diffusers directly onto the surface of transparent optical elements using a sol gel process. The described applications similarly rely solely on the anisotropic diffusion capabilities of holographic diffusers and some mechanically produced diffusion patterns.

Saito (Japanese Patent No. 6-76618) described a lighting system comprising a light source and a holographic element acting as a dichroic mirror to reflect light of substantially one wavelength. The lighting system does not function properly when used with achromatic light sources.

Regarding daylight control, large plastic diffraction gratings have been used to redirect sunlight entering building through skylights and windows. The disadvantage of using such gratings is that they exhibit severe spectral dispersion. This is evident both as color fringes surrounding objects viewed through the gratings and as the separation of sunlight into a diffuse color spectrum that is visible on the walls, floor, and ceiling of the room.

Multi-layer volume holograms have been used as a replacement for diffraction gratings in an attempt to limit the effects of spectral dispersion. However, these light control devices suffer from low transmittance and consequent poor daylight utilization.

SUMMARY OF THE INVENTION

This invention enables construction of kinoform diffusers that exhibit controllable diffusion characteristics with off-axis transmittance and reflectance properties, elimination of zero-order beam, and freedom from spectral dispersion under achromatic illumination. Kinoform diffusers made in accordance with the invention embody surface relief patterns that produce specific beam distributions. These patterns are embodied in physical kinoform diffusers using known photographic techniques and replication technologies. The invention enables physically realizable specific beam distributions other than beam distributions characterized by a negative exponential or substantially Gaussian function.

Laboratory experiments performed by the applicants have revealed at least four classes of kinoform diffusers with desirable non-Gaussian beam distributions. These beam distributions are shown in FIGS. 8A, 8B, 8C, and 8D. A first class is characterized by a beam distribution that is substantially contained within a controllable range of angles and that has a substantially uniform distribution within that range (FIG. 8A). A second class is an elliptical or linear (anisotropic) variant of the first class (FIG. 8B). A third class is also characterized by a beam distribution that is substantially contained within a controllable range of angles but has an annular beam distribution that is desirable for architectural lighting applications utilizing compact light sources such as incandescent or high intensity discharge lamps (FIG. 8C). A fourth class is an elliptical or linear (anisotropic) variant of the third class. It is desirable for architectural lighting applications implemented with linear light sources such as linear fluorescent lamps or linear arrays of light-emitting diodes (FIG. 8D).

Laboratory experiments performed by the applicants have revealed that these four classes of diffusers can be produced by careful preparation, exposure, and development of the photosensitive plates to yield complex surface relief patterns whose height distributions are not directly proportional to the intensity distributions of the recorded laser speckle patterns. Examples of these surface relief patterns are shown in FIGS. 10, 11, and 12.

The invention effects an off-axis beam distribution from a transmissive kinoform diffuser, as shown in FIGS. 3 and 8E. This is accomplished apparently by a combination of multiple internal and external reflections of the transmitted light, as well as near-field interference effects caused by the microscopic surface relief pattern features.

The invention further effects an off-axis beam distribution from a reflective kinoform diffuser, as shown in FIGS. 4 and 8F, in which the diffuser behaves as a diffusing retroreflector for some range of incidence angles. This is accomplished apparently by multiple external reflections of the incident light and near-field interference effects caused by the microscopic surface relief pattern features.

The invention can be implemented as a kinoform diffuser that exhibits a controlled color cast when viewed under conditions of achromatic illumination. This can be achieved by superimposing a weak holographic diffraction grating onto the kinoform diffuser recording. Varying the parameters of the diffraction grating allows the chromaticity and saturation of the color cast to be controlled.

The invention can be implemented as a kinoform diffuser that incorporates a holographic watermark for anti-counterfeiting purposes. This can be achieved by superimposing a weak holographic image onto the kinoform diffuser recording. Because it is spatially distributed throughout the kinoform diffuser, the holographic image is invisible under incoherent illumination. It can, however, be observed at specific angles under coherent illumination. Moreover, a weak holographic image ensures that it does not substantially affect the diffuser beam distribution.

The present invention uses kinoform diffusers as light control components for artificial illumination and daylighting applications. Kinoform diffusers offer the novel optical properties of anisotropic diffusion with controllable distribution characteristics and off-axis transmittance. In common with some holographic diffusers, kinoform diffusers also offer negligible zero-order beam transmission, minimal light loss, and low backscatter over a range of incidence angles. These properties enable the design and manufacture of luminaires that feature anisotropic luminous intensity distributions with minimal glare and high luminaire efficiencies, and of skylights and windows that feature low light losses and controllable distribution of diffused sunlight.

As described in detail below, the optical properties of kinoform diffusers are produced by a surface relief pattern on one or both surfaces of a transparent or opaque substrate. The diffusers may be transmissive or reflective.

The surface relief pattern of a typical kinoform diffuser is presented as a scanning electron microscope (SEM) image in FIG. 10. This diffuser produces a circular (that is, isotropic) diffusion pattern (FIG. 2, leftmost diagram). The surface relief pattern of another typical kinoform diffuser is presented as a SEM image in FIG. 11. This diffuser produces a linear (that is, anisotropic) diffusion pattern (FIG. 2, rightmost diagram). Both of these diffusers are transmissive, and coating their surface relief patterns with an evaporated metal film produces reflective diffusers.

When incident light 36 illuminates a transmissive kinoform diffuser whose surface relief pattern 38 faces away from the direction of the incident light 36 (FIG. 3A), the diffused transmitted light 40 is preferentially directed towards the surface normal n such that $\theta_{peak}(t)<\theta(i)$. When the surface relief pattern 38 faces towards the direction of the incident light 36 (FIG. 3B), the diffused transmitted light 40' is preferentially directed away from the surface normal n such that $\theta_{peak}(t')>\theta(i)$. This off-axis transmittance does not occur with conventional diffusers.

It should further be noted that when incident light 42 illuminates a reflective kinoform diffuser 44 (FIG. 4) at an oblique angle $\theta(i)$, the diffused reflected light 46 is preferentially directed towards the incident light source such that $\theta_{peak}(r) \neq \theta(i)$. The retroreflective behavior contradicts the law of reflection for specular surfaces [IESNA 2000] and does not occur with conventional diffusers.

Kinoform diffusers with elliptical and linear diffusion patterns can be conceptually formed by stretching the surface relief pattern shown in FIG. 10 in a given direction. The roughly circular features shown in FIG. 10 become progressively elliptical; the linear features shown in FIG. 11 are elliptical with an eccentricity of approximately 0.0025.

Linear kinoform diffusers have, therefore, a "plane of diffusion" in which an incident beam of collimated light is diffused into a fan-shaped distribution. This plane is perpendicular to the direction of the linear surface relief pattern features (FIG. 11). Elliptical kinoform diffusers have a similar plane that is perpendicular to the common major axis of the elliptical surface relief pattern features. A linear or an elliptical kinoform diffuser may, therefore, be "oriented" such that its plane of diffusion is aligned in a particular direction with respect to the major axis of a linear light source.

The luminaire designs described herein are dependent on the optical properties of kinoform diffusers and some holographic diffusers. In general, such luminaire designs cannot be achieved with conventional light control components such as reflectors, refractors, diffusers, and shields. In particular, they cannot be achieved with conventional glass or plastic diffusers.

In a first preferred embodiment (FIG. 15), a kinoform diffuser is positioned below and oriented perpendicular to the major axis of a linear light source such that it both diffuses the emitted light in a plane perpendicular to the light source axis and preferentially redirects it downwards towards the work plane. The luminaire has low luminance at high viewing angles in the vertical plane perpendicular to the light source axis and thereby minimizes glare.

In a second preferred embodiment (FIG. 16), a circular or an elliptical distribution kinoform diffuser is positioned below a point light source (such as a compact incandescent or high-intensity discharge arc lamp) such that it both diffuses the emitted light and preferentially redirects it downwards towards the work plane. The luminaire has low luminance at high viewing angles.

In a third preferred embodiment (FIG. 17), a kinoform diffuser is positioned below and oriented parallel to the major axis of a linear light source such that it both diffuses the emitted light in a plane parallel to the light source axis and preferentially redirects it downwards towards the work plane. The luminaire has low luminance at high viewing angles in the plane parallel to the light source axis.

In a fourth preferred embodiment (FIG. 18), a linear or an elliptical distribution kinoform diffuser is positioned below a point light source such that it diffuses the emitted light in a vertical plane and preferentially redirects it downwards towards the work plane. The luminaire has low luminance at high viewing angles in the plane perpendicular to the plane of diffusion.

In a fifth preferred embodiment (FIG. 19), a series of wedge-shaped linear distribution kinoform diffusers are positioned below a point light source and arranged such that each diffuser is oriented radially with respect to said light source. The diffusers both diffuse the emitted light in a vertical plane tangent to nadir and preferentially redirect it downwards towards the work plane. The luminaire has low luminance at high viewing angles.

In a sixth preferred embodiment (FIG. 20), a kinoform diffuser with a transparent central region is positioned below and oriented perpendicular to the major axis of a linear light source such that it both diffuses the emitted light in a plane perpendicular to the light source axis and preferentially redirects it downwards towards the work plane. The luminaire has low luminance at high viewing angles in the vertical plane perpendicular to the light source axis, while the transparent central region in combination with the diffuser provides a linear batwing luminous intensity distribution.

In a seventh preferred embodiment (FIG. 21), a circular distribution kinoform diffuser with a transparent central region is positioned below a point light source such that it both diffuses the emitted light and preferentially redirects it downwards towards the work plane. The luminaire has low luminance at high viewing angles, while the transparent central region in combination with the diffuser provides a rotationally symmetric batwing luminous intensity distribution.

In an eighth preferred embodiment (FIG. 23A), an inwardly folded linear distribution kinoform is positioned below and oriented parallel to the major axis of a linear light source such that it both diffuses the emitted light in a plane parallel to the light source axis and preferentially redirects it downwards towards the work plane. The luminaire has low luminance at high viewing angles in all vertical planes.

In a ninth preferred embodiment (FIG. 25A), an outwardly folded linear distribution kinoform is positioned below and oriented parallel to the major axis of a linear light source such that it both diffuses the emitted light in a plane parallel to the light source axis and preferentially redirects it downwards towards the work plane. The luminaire has low luminance at high viewing angles in all vertical planes.

In a tenth preferred embodiment (FIG. 27), a linear distribution kinoform diffuser is affixed to a curved substrate that is positioned below and oriented parallel to the major axis of a linear light source such that it both diffuses the emitted light in a plane parallel to the light source axis and preferentially redirects it downwards towards the work plane. The luminaire has low luminance at high viewing angles in all vertical planes, while the curved central region provides a linear batwing luminous intensity distribution.

In an eleventh preferred embodiment (FIG. 29), a linear distribution kinoform diffuser with a curved central region is positioned below a linear light source such that it both diffuses the emitted light and preferentially redirects it downwards towards the work plane. The luminaire has low luminance at high viewing angles in all vertical planes, while the curved central region in combination with the planar regions provides a linear batwing luminous intensity distribution.

In a twelfth preferred embodiment (FIG. 30), a linear or elliptical distribution kinoform diffuser is positioned above and oriented parallel to the major axis of a linear light source such that it diffuses the emitted light in a plane parallel to the light source. The luminaire substantially eliminates lamp shadows due to uneven illumination of the ceiling above the lamp sockets (FIG. 31).

In a thirteenth preferred embodiment (FIG. 32), a linear or elliptical distribution kinoform diffuser with a curved central region is positioned below and oriented perpendicular to the major axis of a linear light source such that it both diffuses the emitted light in a plane perpendicular to the light source axis and preferentially redirects it downwards towards the work plane. The luminaire has low luminance at high viewing angles in all vertical planes, while the curved central region provides a linear batwing luminous intensity distribution with essentially complete elimination of the light source image from all viewing angles.

In a fourteenth preferred embodiment (FIG. 33), a circular distribution kinoform diffuser with a curved central region is positioned below a point light source such that it both diffuses the emitted light and preferentially redirects it downwards towards the work plane. The luminaire has low luminance at high viewing angles in all vertical planes, while the curved central region provides a circular batwing luminous intensity distribution with essentially complete elimination of the light source image from all viewing angles.

In a fifteenth preferred embodiment (FIG. 34), a reflective kinoform diffuser with a linear or an elliptical distribution is positioned above and oriented parallel to a linear light source such that it both diffuses the emitted light in a plane perpendicular to the light source axis and preferentially redirects downwards towards the work plane. The luminaire has low luminance at high viewing angles in the vertical plane perpendicular to the light source axis.

In a sixteenth preferred embodiment (FIG. 35), a reflective kinoform diffuser with a circular distribution may be positioned above a linear or point light source such that it both diffuses the emitted light and preferentially redirects it downwards towards the work plane.

In a seventeenth preferred embodiment (FIG. 36), a skylight or window consisting of a transmissive kinoform diffuser both diffuses and preferentially redirects diffused sunlight downwards towards the work plane. It performs the function of a motor-driven heliostat without the need for active control devices.

Additional objects and advantages of this invention will be apparent from the following detailed description of preferred embodiments thereof which proceeds with reference to the accompanying drawings.

DETAILED DESCRIPTION OF PREFERRED EMBODIMENTS

A kinoform diffuser made in accordance with the invention is composed of a complex surface relief pattern that produces controllable diffusion characteristics with off-axis transmittance and reflectance properties, elimination of zero-order beam, and freedom from spectral dispersion under achromatic illumination.

Prior art techniques as described by Gray enable the fabrication of surface-relief holographic diffusers that exhibit elimination of zero-order beam and freedom from spectral dispersion under achromatic illumination. However, on page 767, Gray states: "The incoherent summation of uncorrelated speckle patterns . . . can be carried out by making a series of exposures of a photoresist film to the far-field speckle pattern from a ground glass diffuser, moving a new part of the ground glass into the laser beam for each exposure." As noted by Dainty, each laser speckle pattern is uncorrelated with respect to the other patterns.

Laboratory experiments performed by the applicants have revealed certain advantages to moving the photosensitive plate rather than the ground glass diffuser between exposures. The laser speckle pattern remains unchanged, and so the recorded patterns are spatially autocorrelated.

The incoherent summation of autocorrelated speckle patterns has not been theoretically analyzed in the published literature. However, applicants' laboratory experiments have revealed that the resultant kinoform diffuser beam distribution is not necessarily characterized by a substantially Gaussian function. Various combinations of the number of exposures and movement of the photosensitive plate between said exposures contribute to the production of kinoform diffusers with uniform and annular beam distributions as shown in FIGS. 8A, 8B, 8C, and 8D. Unlike Gaussian distributions, these beam distributions exhibit greatly reduced scattering outside of the specified range of angles. Movement of the photosensitive plate between exposures also enables the fabrication of kinoform diffusers that exhibit elimination of zero-order beam and freedom from spectral dispersion under achromatic illumination.

Figure 8A:
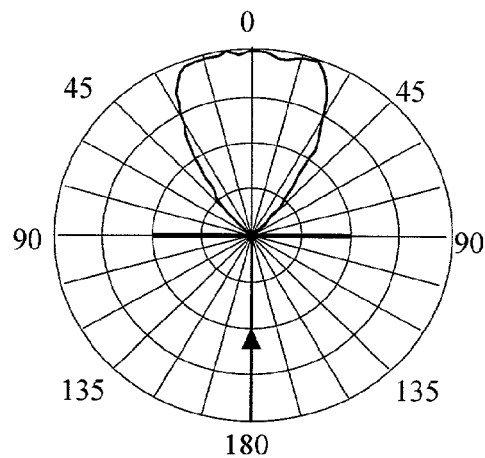
FIGS. 8A, 8B, 8C, and 8D show the beam distributions for four classes of kinoform diffusers, the surface relief patterns of which are facing the incident beam.
Figure 8B:
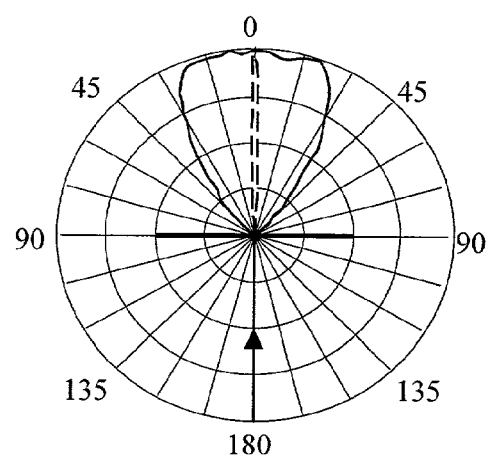
Figure 10:
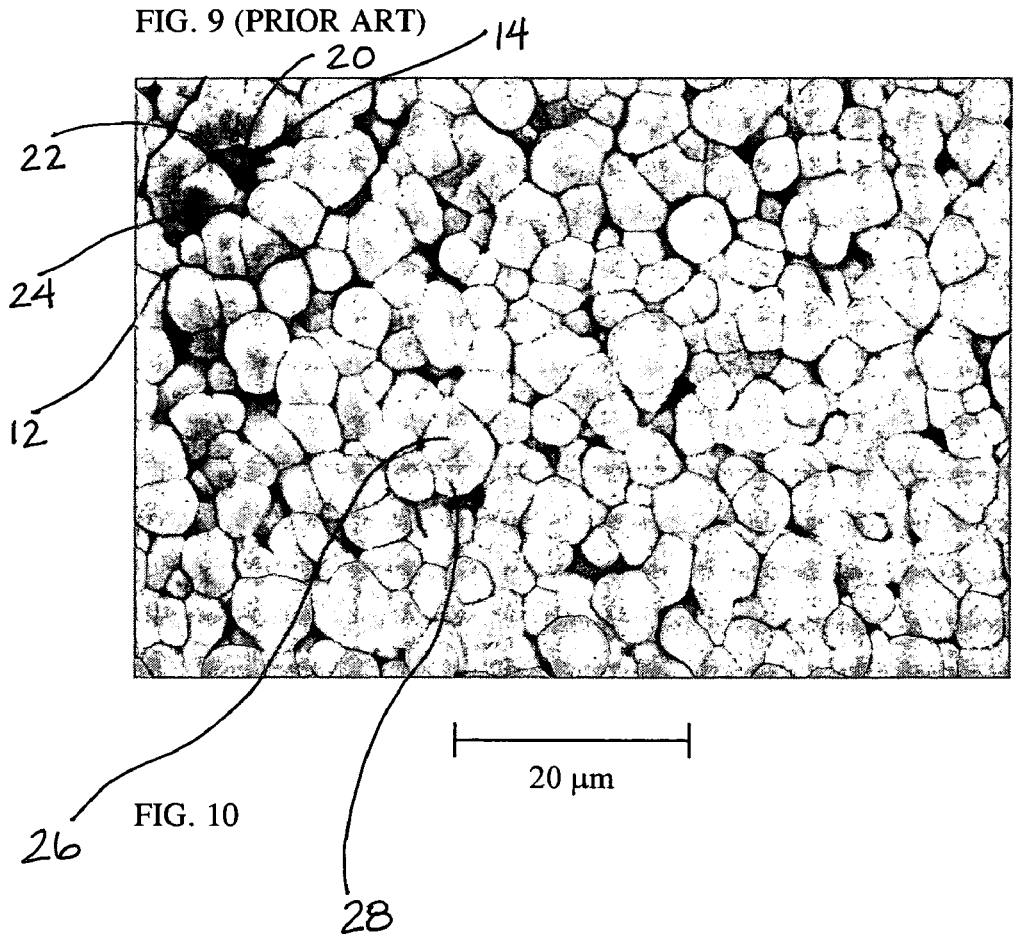
FIG. 10 is a photomicrograph showing a plain view of a region of a surface relief pattern of a circular distribution kinoform diffuser constructed in accordance with the invention to exhibit a uniform beam distribution.
Figure 11:
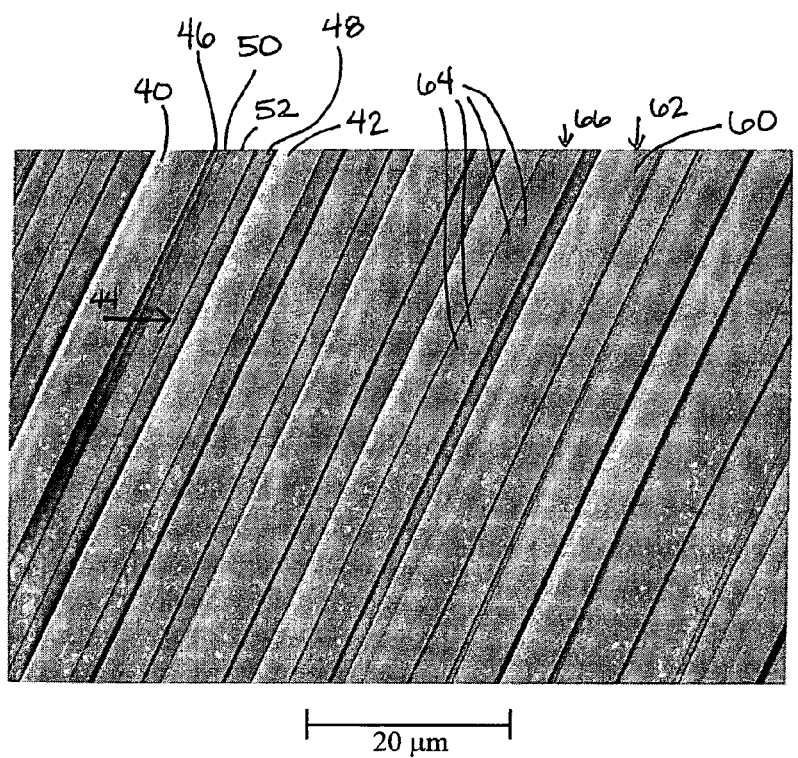
FIG. 11 shows a photomicrograph of a linear distribution kinoform diffuser constructed in accordance with the invention to exhibit a uniform beam distribution.

As described by Gray and others, surface-relief optical diffusers require that their surface relief height distributions be directly proportional to the intensity distributions of the recorded laser speckle patterns. When viewed with a scanning electron microscope, these surface relief patterns resemble a series of smoothly rolling hills. However, the applicants have learned through laboratory experiments that a complex surface relief pattern of "pebbles" (as shown in FIG. 10) significantly contributes to the production of circular (isotropic) kinoform diffusers with uniform beam distributions, as shown in FIG. 8A. Similarly, a complex surface relief pattern of "corrugations" (as shown in FIG. 11) significantly contributes to the production of elliptical and linear (anisotropic) kinoform diffusers with uniform beam distributions, as shown in FIG. 8B.

Applicants have also learned through laboratory experiments that a complex surface relief pattern of "pits" (resembling an impression of the pebbled surface shown in FIG. 10) also significantly contribute to the production of circular (isotropic) kinoform diffusers with uniform beam distributions, as shown in FIG. 8A.

Figure 8C:
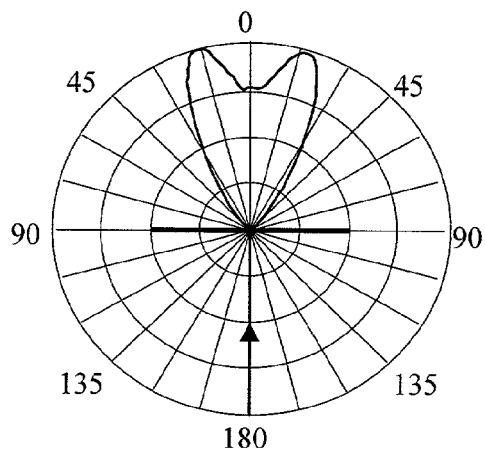
Figure 8D:
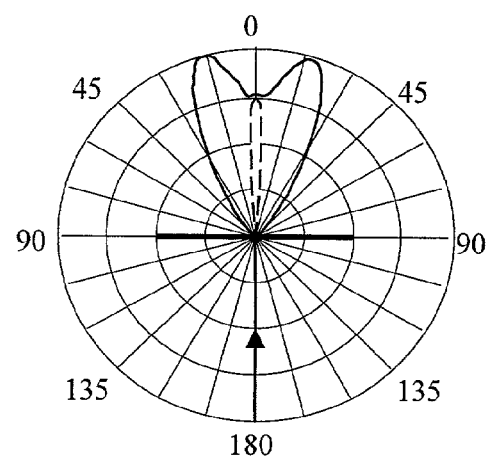
Figure 8E:
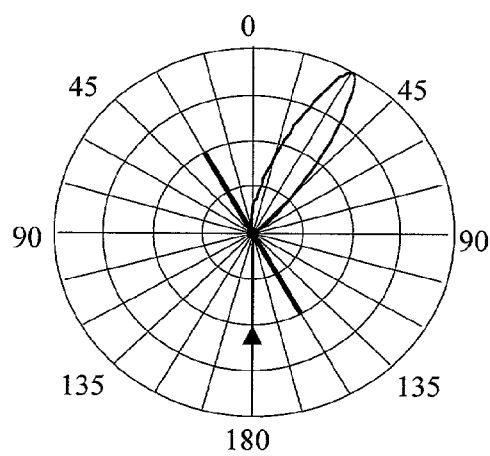
FIG. 8E shows the off-axis transmittance of an incident beam with an incidence angle of 60 degrees.
Figure 12:
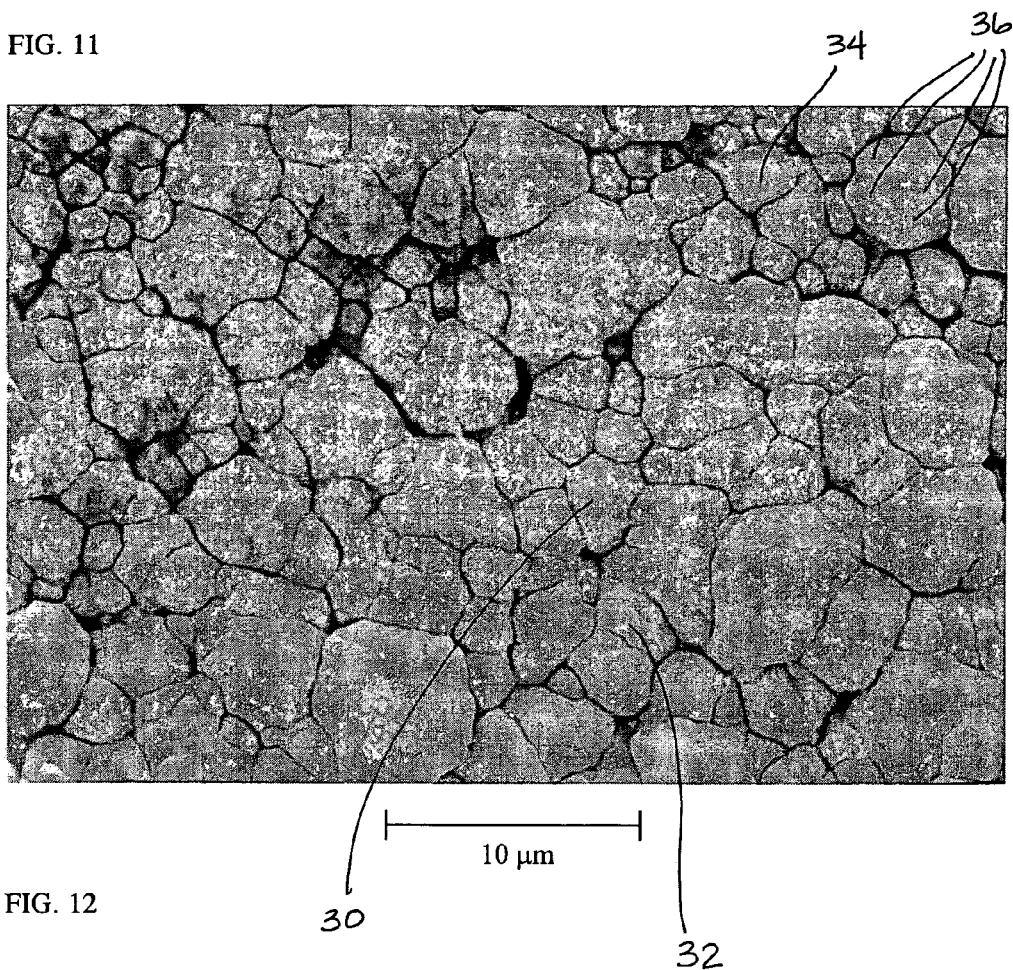
FIG. 12 shows a photomicrograph of a circular distribution kinoform diffuser constructed in accordance with the invention to exhibit a rotationally symmetric batwing beam distribution.
Figure 13A:
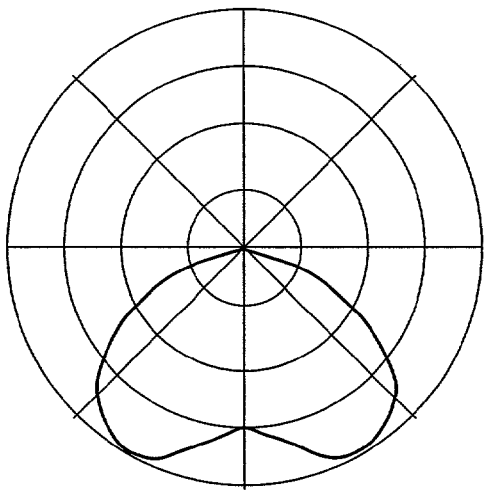
FIG. 13A illustrates the circular (isotropic) "batwing" luminous intensity distribution used to provide even illuminance distribution on a work plane or ceiling. The distribution is the same for all vertical planes.
Figure 13B:
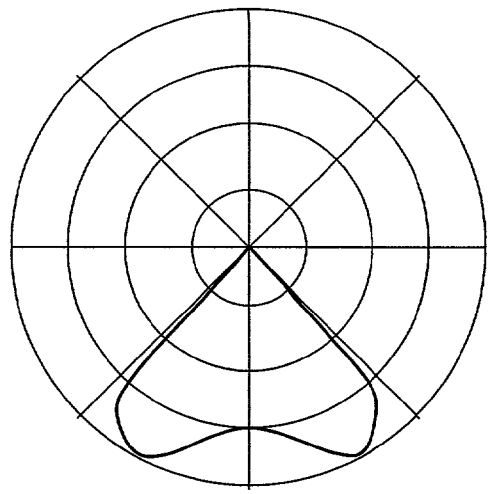
FIG. 13B illustrates a circular batwing luminous intensity distribution with sharp cutoff characteristics.
Figure 13C:
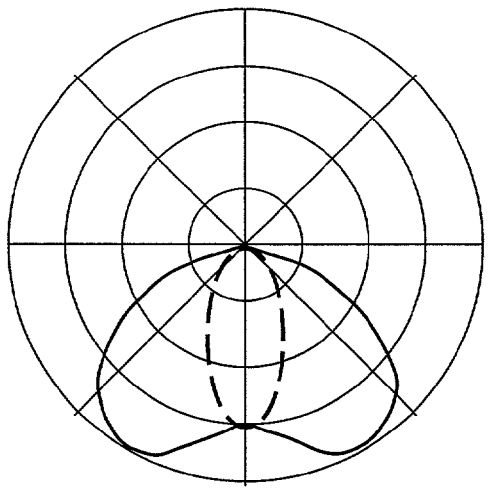
FIG. 13C illustrates a substantially linear (anisotropic) batwing luminous intensity distribution used to provide even illuminance distribution for indoor hallways and exterior roadways. The distribution varies for different vertical planes, where the 0-degree vertical plane is by convention ([IESNA 2000]) parallel to the major axis of the lamp or luminaire.
Figure 13D:
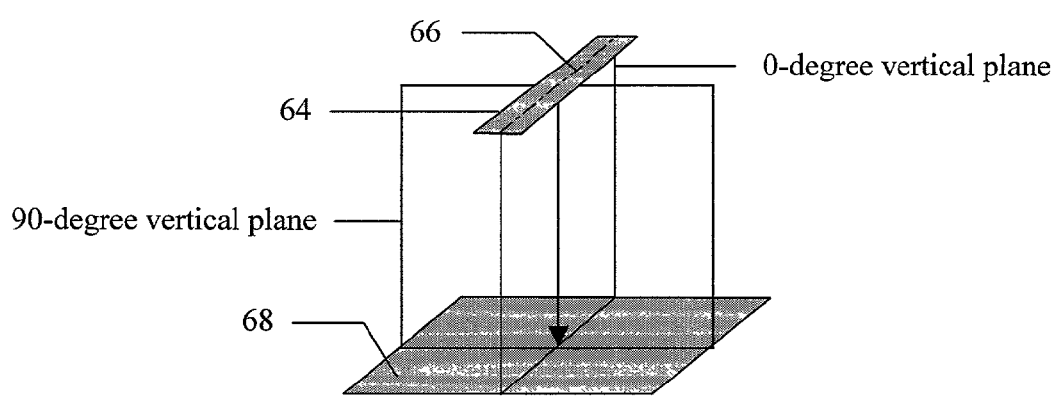
FIG. 13D is a diagram showing two exemplary vertical planes set in different locations established by different angular displacements (0°, 90°) about a common axis perpendicular to a longitudinal axis of a linear light source and the place of diffusion.

The surface relief pattern of the kinoform diffuser shown in FIG. 12 includes multiple light scattering elements in the form of pebbles. The applicants have further learned through laboratory experiments that a pattern of one or more sub-elements or granules formed on the surface of each pebble (as shown in FIG. 12), pit, or corrugation significantly contributes to the production of kinoform diffusers with batwing beam distributions, as shown in FIGS. 8C and 8D.

The present invention is preferably implemented with the use of positive photoresist materials such as Shipley 1818 from Shipley Company (Marlborough, Mass.). These materials typically have nonlinear characteristic responses to the exposing light. Unlike prior art techniques as taught by Gray and others, the invention exploits this property by using a combination of controlled parameters for the preparation, exposure, and development of the photoresists and a relatively thick photoresist layer that can be etched to a depth of multiple wavelengths of visible light.

The surface relief features of pits or corrugations are apparently formed by the exposure of the photoresist material to a volumetric cross-section of the three-dimensional laser speckle pattern. The photoresist material is then processed to etch away the exposed portions and produce the three-dimensional scattering elements. Negative photoresist materials such as Microchem SU-8 available from Microchem Corporation (Newton, Mass.) may be used to produce pebbles rather than pits.

The photoresist is applied to a glass substrate using known spin coating techniques. The coating thickness is determined by the photoresist viscosity and the rotation speed, but is generally between 3.0 and 12.0 microns. A single layer of photoresist or multiple layers of photoresists with varying formulations may be usefully applied to the substrate to achieve composite photoresists with desirable nonlinear characteristic responses.

The photoresist characteristic response is partly dependent upon the concentration of solvent (typically propylene glycol monomethyl ether acetate) remaining in the material at the time of exposure. It may be necessary to "prebake" the photoresist coating at an elevated temperature to remove the majority of the solvent through evaporation while ensuring that the photoactive component of the resist is not thermally decomposed. The bake time, temperature, humidity, and airflow are carefully controlled during this process to achieve consistent and desirable results.

Figure 5:
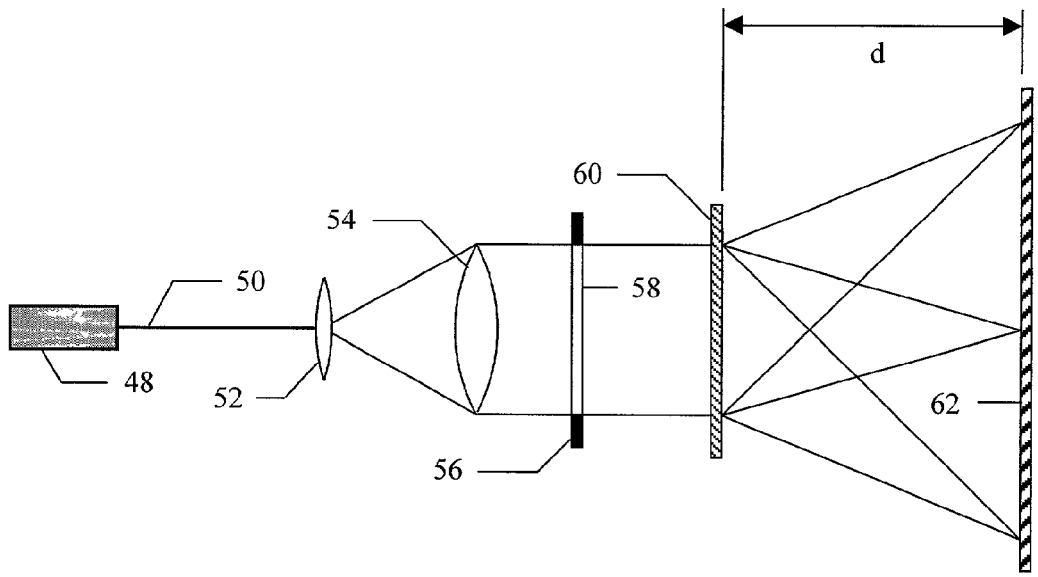
FIG. 5 shows a prior art single-beam holographic setup for the recording of kinoform diffusers.
Figure 6:
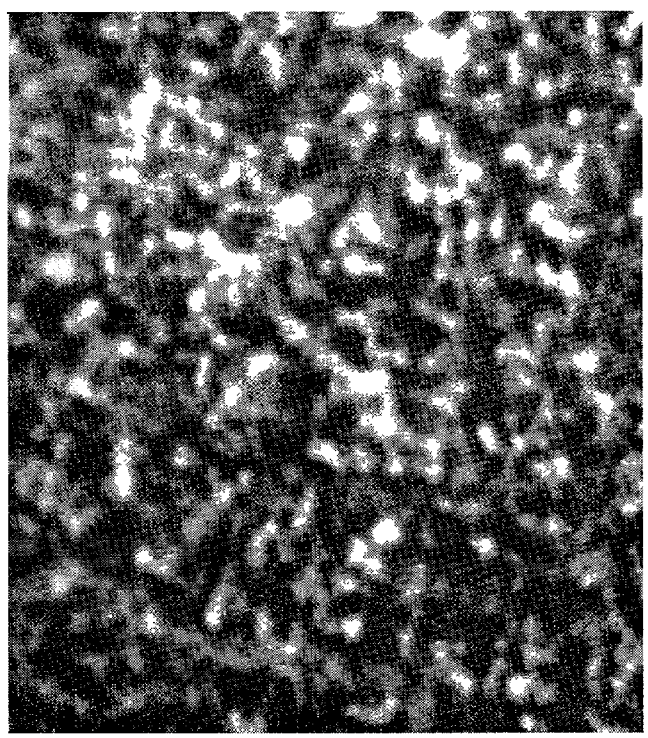
FIG. 6 shows a photomicrograph of a typical recorded laser speckle pattern produced by the prior art holographic setup of FIG. 5.
Figure 7:
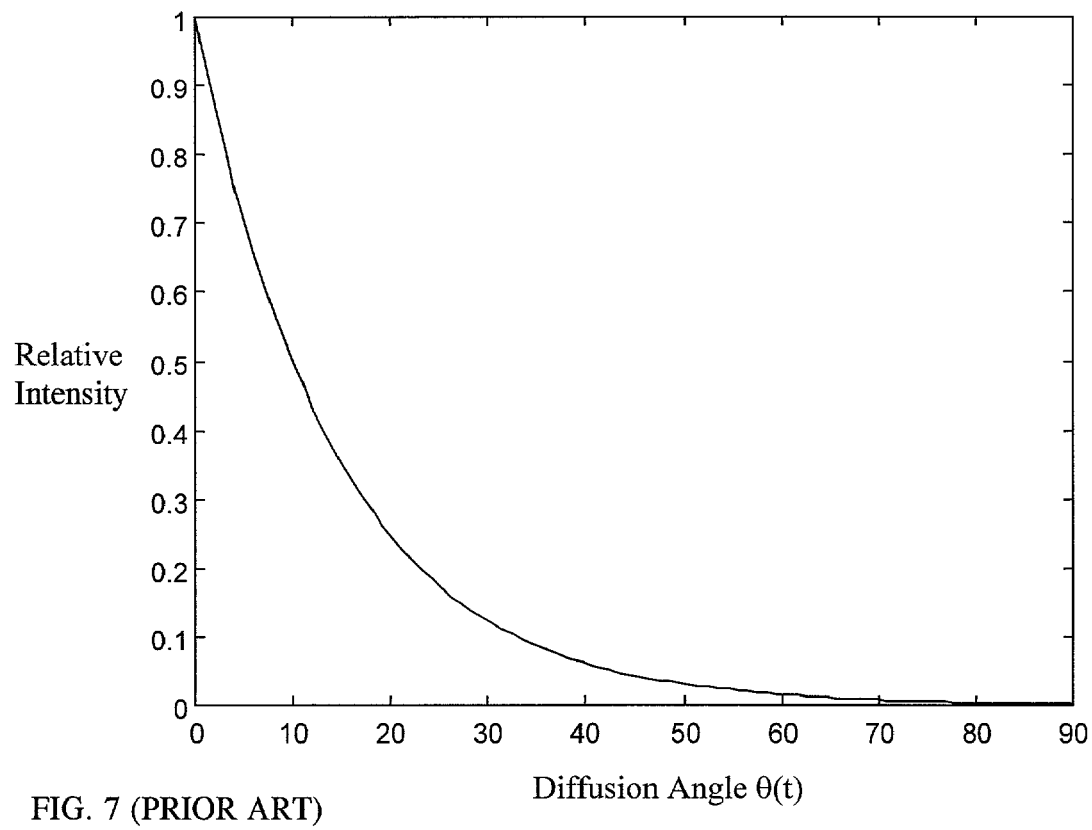
FIG. 7 shows the expected negative exponential laser speckle intensity as a function of scattering angle from a prior art single-exposure kinoform diffuser.

The photoresist is then exposed to one or a multiplicity of laser speckle patterns. With reference to FIG. 5, the coherent laser beam produced by beam expansion lenses 52 and 54 can be parallel, convergent, or divergent, depending upon the desired kinoform diffuser beam distribution. A non-uniform laser beam intensity profile may also be usefully employed to modify the resultant kinoform diffuser beam distribution. The photoresist may be uniformly exposed prior to exposure to the laser speckle pattern or patterns to pre-sensitize the photoactive component.

The individual laser speckle pattern exposure times are dependent upon the laser power, beam expansion optics, diffuser opacity, and photoresist sensitivity. The laser power may be intentionally reduced to induce reciprocity failure in the photoresist and thereby usefully amplify the nonlinear effects of thin film interference exposure. Regardless, careful exposure control ensures that the maximum exposure is within the dynamic range of the processed photoresist.

Following exposure, the photoresist may optionally be subjected to a "postbake" process at an elevated temperature. This process serves to alleviate the deleterious effects of thin film interference (i.e., standing wave) exposure within the photoresist by diffusing the photoactive component (typically diazonaphthoquinone for positive resists) through the resist matrix (typically a phenolic-formaldehyde resin called "novolac"). It may also be used to thermally catalyze chemical reactions, thereby amplifying the latent image. Again, the bake time, temperature, humidity, and airflow are carefully controlled to achieve consistent and desirable results.

The granules shown in FIG. 12 appear to be produced as a result of thin film interference exposure within the photoresist. For kinoform diffusers where such corrugations are desirable, postbaking may not therefore not be necessary.

The photoresist is then developed using an alkaline developer such as sodium hydroxide. Commercial developers may contain proprietary additives for specific purposes that modify the photoresist etching process. These additives may usefully modify the photoresist characteristic response.

There are several conventional techniques for applying the developer, including spin coating, spray development, and puddle development. The development time and temperature, together with the developer concentration, are parameters that affect the resultant characteristic response.

Following development, the photoresist may optionally be subjected to a "post-development bake" process at an elevated temperature. This process serves to harden the developed photoresist through crosslinking of the novolac resin and to optionally modify the surface relief profile through softening and plastic flow.

An important attribute of photoresist processing for kinoform diffusers is the resultant contrast γ (gamma), which is expressed as:

$$\gamma = 1/(\log_{10}(E_{max}/E_{min})), \quad (3)$$

where $E_{min}$ is the minimum actinic exposure (measured in millijoules per square centimeter) required to produce a photochemical reaction in the photoactive component leading to etching, and $E_{max}$ is the maximum actinic exposure required to produce etching of the photoresist to the underlying substrate.

The resultant gamma is dependent upon the prebake, exposure, postbake, development, and post-development bake parameters. These parameters are in turn dependent upon the photoresist composition and developer additives. Although skilled persons will realize that it is difficult to characterize the effect of these parameters in combination or predict the results stemming from changing them, the applicants have discovered that the following interrelated parameters affect the resultant gamma: photoresist composition, prebaking, laser beam wavelength, laser power and exposure times, postbaking, developer formulation, developer concentration, development time, development temperature, and post-development baking.

Finding an appropriate combination of process parameters that allows for the production of kinoform diffusers with controllable non-uniform beam distributions is a trial-and-error process. Applicants have determined that desirable non-uniform beam distributions can be consistently and reliably produced, and that the beam distribution parameters can be incrementally controlled. In particular, the distributions can be continuously varied between the uniform beam distributions shown in FIGS. 8A and 8B to the non-uniform distributions shown in FIGS. 8C and 8D, respectively.

The zero-order beam can be eliminated by exposing the photoresist to a multiplicity of autocorrelated laser speckle patterns. These patterns may be produced by one or more of the following mechanical movements: shift photoresist plate perpendicular to laser beam direction; shift diffuser perpendicular to laser beam direction; shift photoresist plate parallel to laser beam direction; shift diffuser parallel to laser beam direction; rotate photoresist plate about axis perpendicular to laser beam direction; rotate diffuser about axis perpendicular to laser beam direction; rotate photoresist plate about axis parallel to laser beam direction; and rotate diffuser about axis parallel to laser beam direction. In addition, the laser beam intensity profile incident upon the diffuser can be optically modified to effect a partial decorrelation of the laser speckle pattern.

In a first preferred embodiment, a kinoform diffuser with the uniform beam distribution shown in FIG. 8A may be produced by first spin coating a glass plate with Shipley 1818 or 1827 positive photoresist. This plate is then optionally prebaked at 85 degrees C. for thirty minutes in an oven to remove excess solvent.

The baked plate is cooled to room temperature and exposed to a laser speckle pattern generated using the optical setup shown in FIG. 5, using opaque mask 56 with a circular aperture 58. A 180-milliwatt helium-cadmium laser is used to illuminate the ground glass diffuser 60.

The exposed plate is then shifted in a random direction perpendicular to the illuminating beam axis before exposing the plate to the same laser speckle pattern. This process is repeated several times to eliminate zero-order beam transmission.

Following exposure, the plate may optionally be postbaked at 110 degrees C. for five minutes in an oven to eliminate possible defects resulting from thin film interference and thermally catalyze chemical reactions that may amplify the latent image.

The exposed plate is developed in Shipley 303A developer diluted with water and is then placed in a water rinse bath to stop the etching process, dried, and optionally post-baked at 110 degrees C. for 60 seconds.

By changing the development time, a kinoform diffuser with the non-uniform beam distribution shown in FIG. 8C may be produced. Varying the development time produces a continuous and controllable variation in the beam distribution.

By substituting an elliptical or rectangular aperture 58 in opaque mask 56, kinoform diffusers with elliptical or linear beam distributions may be produced as shown in FIG. 8B and FIG. 8D, respectively.

In a second preferred embodiment of the invention, a digitized representation of the three-dimensional surface relief pattern comprising the kinoform diffuser is computer-generated from mathematical models or obtained from a scanning confocal microscope. This representation is then fabricated in a photopolymerizable resin using known stereolithography techniques as described in Maruo, S. et al., "Three-Dimensional Microfabrication with Two-Photon-Absorbed Photopolymerization," Optics Letters 22(2):132-134 (Jan. 15, 1997), Cumpston, B. J., et al., "Two-Photon Polymerization Initiators for Three-Dimensional Optical Data Storage and Microfabrication," Nature 398(4):51-54 (Mar. 4, 1999), and Galajda, P., and P. Ormos, "Complex Micromachines Produced and Driven by Light," Applied Physics Letters 78(2): 249-251 (Jan. 8, 2001). As described, for example, in the publication of Galajda and Ormos, a layer of Norland NOA 63 optical adhesive from Norland Products (Cranbury, N.J.) is applied to a substrate. The 514 nm line output of a 20 milliwatt argon laser is then focused to a 0.5 μm diameter spot within said layer to initiate two-photon polymerization. Moving the substrate along a preprogrammed trajectory with a P3D 20-100 three-axis piezo translation stage from Linos Photonics (Milford, Mass.) allows arbitrary three-dimensional microstructures to be fabricated. The unexposed resin is then removed by dissolving in acetone.

Skilled persons will appreciate that the surface relief pattern responsible for the optical characteristics of a transmissive kinoform diffuser is the boundary between two transparent media with different indices of refraction. The claimed invention encompasses, therefore, any embodiment in which a protective layer of a transparent medium with a different refractive index is applied to the surface of a kinoform diffuser. As an example, a transmissive kinoform diffuser made from a polymerized optically transparent resin with a refractive index of 1.56 could be coated with fluoropolymer such as Teflon AF from E.I. du Pont de Nemours and Company with a refractive index of 1.30.

In the present invention, kinoform diffusers as described above are microscopic surface relief patterns applied to one or both surfaces of substantially transparent optical elements such as glass or plastic substrates. Various manufacturing methods may be employed, including but not limited to: a) casting and curing of ultraviolet-polymerizable resin films onto glass or plastic substrates; b) embossing plastic substrates or films; c) vacuum-forming plastic substrates; d) lamination of plastic films with kinoform diffusers onto glass or plastic substrates; e) bulk casting or injection molding of glass or plastic substrates; and f) casting or embossing of sol gel materials onto glass or plastic substrates. These optical elements are then used in the manufacture of luminaires in accordance with the design principles of the present invention as disclosed herein.

Skilled persons will appreciate that such kinoform diffusers may perform additional light control functions because of their bulk shape or macroscopic surface-relief patterns generated by embossing, casting, vacuum-forming, injection molding, or other manufacturing techniques. Examples include kinoform diffusers applied to radially symmetric and cylindrical lenses, lens arrays, microlens arrays, and Fresnel lenses. Antireflection coatings may also be applied to reduce unwanted reflections from the surfaces of transparent optical elements such as glass or plastic substrates. Moreover, skilled persons will appreciate that such substantially transparent diffusers may be coated on one or both surfaces with partly reflective films such as vacuum-deposited aluminum to further control the distribution of light without negating the design principles of the present invention as disclosed herein.

Figure 15:
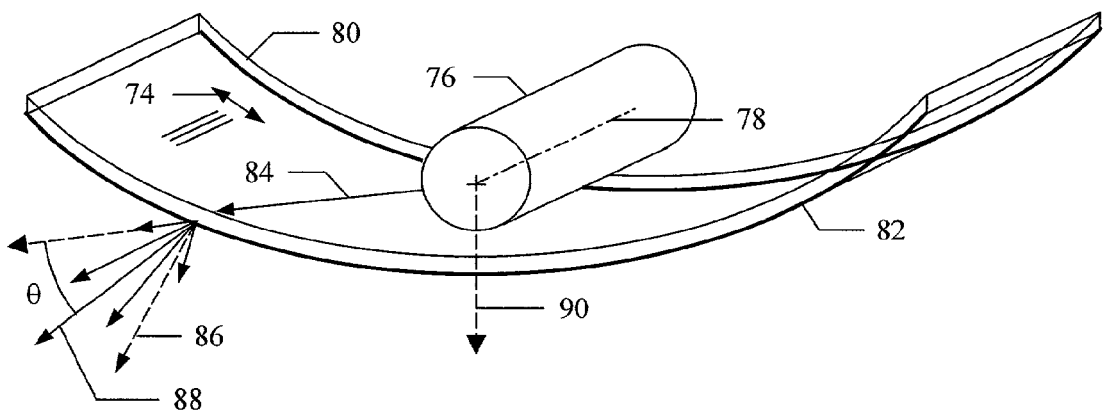
FIG. 15 illustrates a luminaire with a linear light source utilizing a linear or an elliptical distribution kinoform diffuser to minimize glare at high viewing angles in the vertical plane perpendicular to the light source axis.

In a first preferred embodiment (FIG. 15), a curved transparent substrate 80 is positioned below a linear light source 76 having a longitudinal or major axis 78, with a kinoform diffuser 82 applied to the side of substrate 80 facing away from light source 76. Kinoform diffuser 82 is oriented such that its plane of diffusion 74 is perpendicular to major axis 78 of light source 76.

Kinoform diffuser 82 will diffuse an incident ray of light 84 emitted by light source 76 into the luminous flux distribution schematically indicated by a set of rays 88. In accordance with the novel controllable diffusion characteristics of kinoform diffusers described above, luminous flux distribution 88 (that is, the diffusion characteristics) may be varied in a controlled manner during production of the kinoform diffuser to provide an optimum luminous intensity distribution for the luminaire, as determined by its intended application.

In addition, the diffusion characteristics of kinoform diffuser 82 may be spatially varied according to the horizontal distance of the diffuser from major axis 78 of light source 76, with different linear segments of the kinoform diffuser parallel to the light source axis having different diffusion characteristics.

Also in accordance with the novel off-axis transmission properties of kinoform diffusers, the direction of maximum intensity of luminous flux distribution 88 is offset from the direction of incident ray of light 84 by an angle $\theta$ towards a local surface normal 86 of kinoform diffuser 82 at the point of intersection, where said angle may be varied in a controlled manner during production of kinoform diffuser 82. The light emitted by light source 76 at high viewing angles is, therefore, redirected downwards towards nadir 90. This advantageously increases the illuminance of the work plane and simultaneously reduces the luminance of the luminaire at high viewing angles in horizontal directions substantially perpendicular to the light source axis, which thereby reduces its glare.

These advantages are most effectively realized with a linear distribution kinoform diffuser. However, an elliptical distribution kinoform diffuser may advantageously be used to increase the apparent width of light source 76 when viewed directly through kinoform diffuser 82 from directions that are substantially perpendicular to the light source axis.

Figure 16:
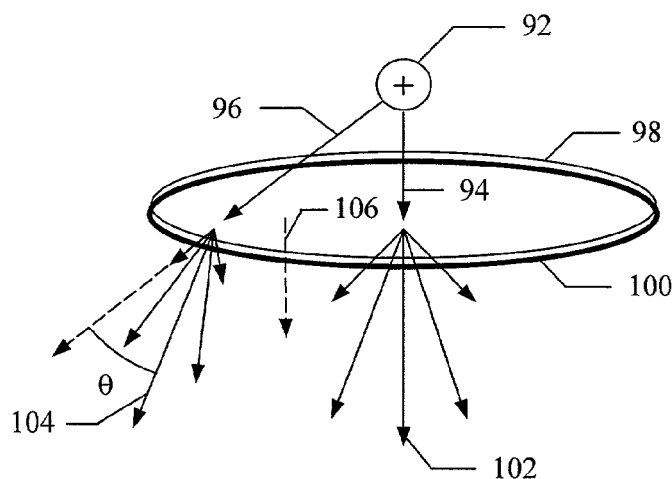
FIG. 16 illustrates a luminaire with a point light source utilizing a circular or an elliptical distribution kinoform diffuser to minimize glare at high viewing angles.

In a second preferred embodiment (FIG. 16), a transparent substrate 98 is positioned below a point light source 92, with a circular or elliptical distribution kinoform diffuser 100 applied to the side of said substrate facing away from light source 92.

Kinoform diffuser 100 will diffuse incident rays of light 94 and 96 emitted by light source 92 into the luminous flux distributions schematically indicated by the respective sets of rays 102 and 104. Similar to the first preferred embodiment, luminous flux distributions 102 and 104 may be varied in a controlled manner during production of kinoform diffuser 100. The diffusion characteristics of kinoform diffuser 100 may also be spatially varied according to the radial distance of the diffuser from the vertical axis of light source 92.

Also in accordance with the novel off-axis transmission properties of kinoform diffusers, the direction of maximum intensity of luminous flux distribution 104 is offset from the direction of incident ray of light 96 by an angle $\theta$ towards a surface normal 106 of kinoform diffuser 100, where said angle may be varied in a controlled manner during production of kinoform diffuser 100. The light emitted by light source 92 at high viewing angles is, therefore, redirected downwards towards nadir. This advantageously increases the illuminance of the work plane and simultaneously reduces the luminance of the luminaire at high viewing angles for all vertical planes.

These advantages are most effectively realized with a circular distribution kinoform diffuser. However, an elliptical distribution kinoform diffuser may advantageously be used to generate an elliptical luminous intensity distribution for the luminaire, as determined by its intended application.

In a third preferred embodiment (FIG. 17), a transparent substrate 116 is positioned below a linear light source 108 having a major axis 110, with a kinoform diffuser 118 applied to the side of substrate 116 facing away from light source 108. Kinoform diffuser 118 is oriented such that its plane of diffusion 120 is parallel to the major axis of light source 108.

Kinoform diffuser 118 will diffuse an incident ray of light 114 emitted by light source 108 into the luminous flux distributions schematically indicated by a ray 122. In accordance with the novel off-axis transmission properties of kinoform diffusers, the direction of maximum intensity of luminous flux distribution 122 is offset from the direction of incident ray of light 114 by an angle $\theta$ towards a surface normal 124 of kinoform diffuser 118, where said angle may be varied in a controlled manner during production of kinoform diffuser 118. The light emitted by light source 108 at high viewing angles in the vertical plane parallel to the light source axis is, therefore, redirected downwards towards nadir 112. This advantageously increases the illuminance of the work plane and simultaneously reduces the luminance of the luminaire at high viewing angles in horizontal directions substantially parallel to the light source axis. (Skilled persons will appreciate that this advantage cannot be achieved using conventional diffusers without the use of baffles or louvers.)

Figure 18:
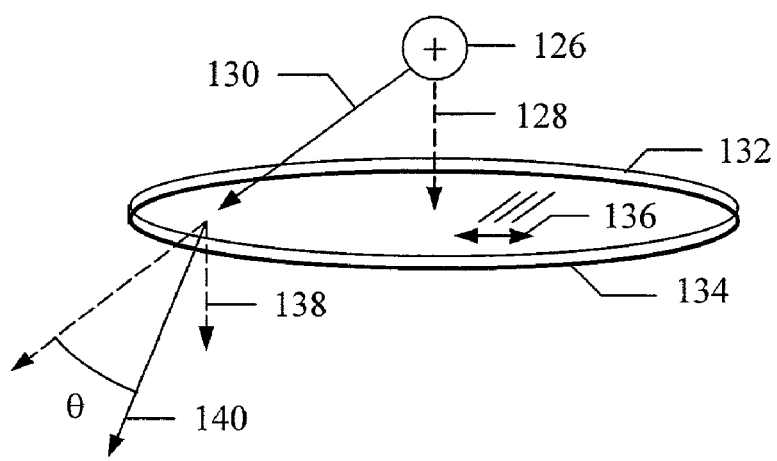
FIG. 18 illustrates a luminaire with a point light source utilizing a linear or an elliptical distribution kinoform diffuser to minimize glare at high viewing angles in the plane parallel to the plane of diffusion.

In a fourth preferred embodiment (FIG. 18), a transparent substrate 132 is positioned below a point light source 126, with a linear distribution kinoform diffuser 134 applied to the side of substrate 132 facing away from light source 126.

Kinoform diffuser 134 will diffuse a ray of light 130 emitted by light source 126 into the luminous flux distribution schematically indicated by a ray 140. In accordance with the novel controllable diffusion characteristics of kinoform diffusers, said luminous flux distributions may be varied in a controlled manner during production of kinoform diffuser 134. In addition, the diffusion characteristics of kinoform diffuser 134 may be spatially varied according to its radial distance from the vertical axis 128 of light source 126.

Also in accordance with the novel off-axis transmission properties of kinoform diffusers, the direction of maximum intensity of luminous flux distribution 140 is offset from the direction of ray of light 130 by an angle $\theta$ towards a surface normal 138 of kinoform diffuser 134, where said angle may be varied in a controlled manner during production of kinoform diffuser 134. The light emitted by light source 126 at high viewing angles is, therefore, redirected downwards towards nadir along vertical axis 128. This advantageously increases the illuminance of the work plane and simultaneously reduces the luminance of the luminaire at high viewing angles for horizontal directions substantially parallel to the plane of diffusion 136.

Figure 1:
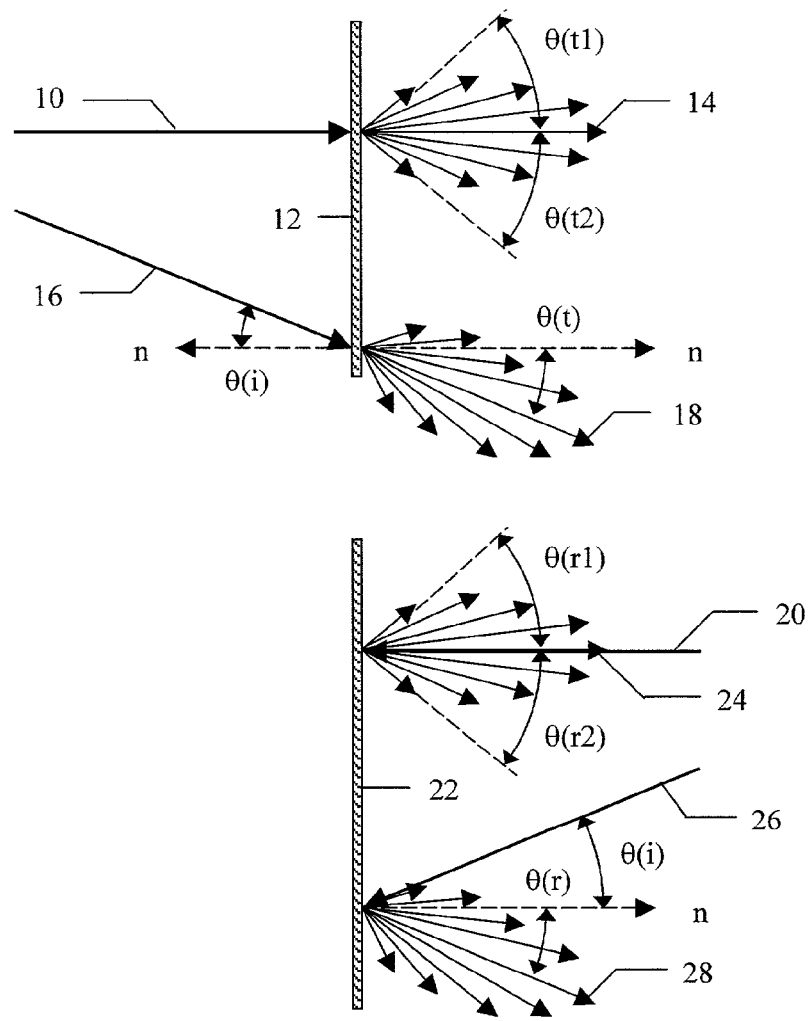
FIG. 1 is a schematic illustration of the scattering of incident beams of collimated light by prior art transmissive and reflective diffusers.
Figure 2:
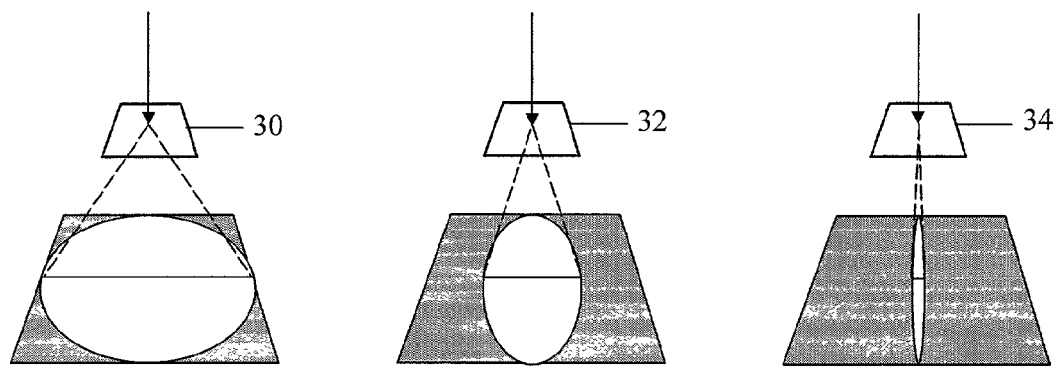
FIG. 2 is a schematic illustration of the cross-sections of the scattered light beam distributions from a prior art isotropic (circular) diffuser, elliptical anisotropic diffuser, and substantially linear anisotropic diffuser.
Figures 3A, 3B:
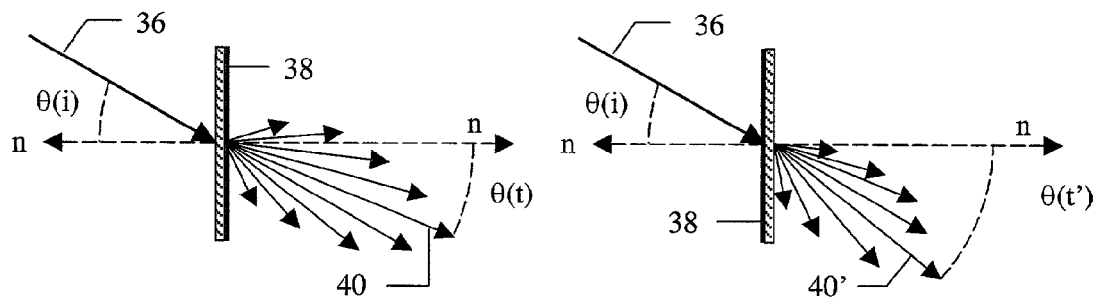
FIGS. 3A and 3B are schematic illustrations of off-axis beam distributions for transmissive kinoform diffusers designed in accordance with the invention with their surface relief patterns facing, respectively, away from and toward the direction of incident light.
Figure 4:
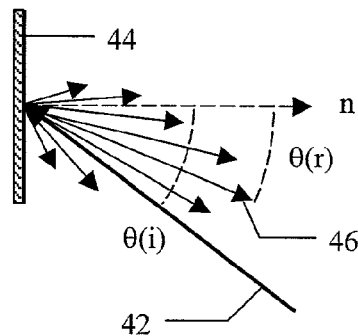
FIG. 4 is a schematic illustration of an off-axis beam distribution for a reflective kinoform diffuser designed in accordance with the invention.

The fourth preferred embodiment (FIG. 18) is similar in concept to the second preferred embodiment (FIG. 16); the difference is that the linear diffusion characteristics of kinoform diffuser 134 provides a substantially linear (anisotropic) luminous intensity distribution for the luminaire (FIG. 2, rightmost diagram).

Figure 19:
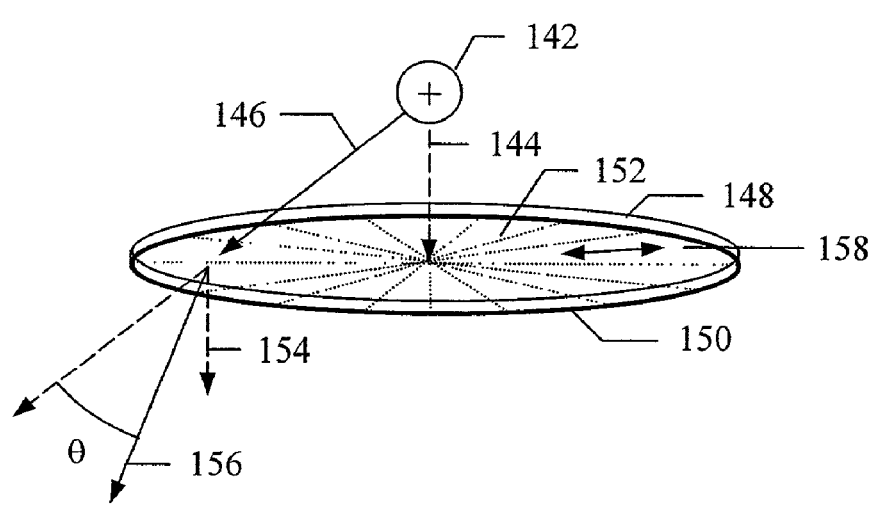
FIG. 19 illustrates a luminaire with a point light source utilizing a series of wedge-shaped linear or elliptical distribution kinoform diffusers to minimize glare at high viewing angles.

In a fifth preferred embodiment (FIG. 19), a transparent substrate 148 is positioned below a point light source 142, with a kinoform diffuser 150 composed of a multiplicity of wedge-shaped linear or elliptical distribution kinoform diffuser segments 152 applied to the side of substrate 148 facing away from light source 142. Each kinoform diffuser segment 152 is oriented such that its plane of diffusion 158 is radial to a vertical axis 144 of light source 142.

Kinoform diffuser segments 152 will diffuse a ray of light 146 emitted by light source 142 into the luminous flux distribution schematically indicated by a ray 156.

In accordance with the novel controllable diffusion characteristics of kinoform diffusers, luminous flux distribution 156 may be varied in a controlled manner during production of kinoform diffuser 150. In addition, the luminous flux distribution characteristics of kinoform diffuser segments 152 may be varied according to the radial distance of diffuser 150 from vertical axis 144 of light source 142.

Also in accordance with the novel off-axis transmission properties of kinoform diffusers, the direction of maximum intensity of luminous flux distribution 156 is offset from the direction of incident ray of light 146 by an angle $\theta$ towards a surface normal 154 of kinoform diffuser segments 152, where said angle may be varied in a controlled manner during production of kinoform diffuser 150. The light emitted by light source 142 at high viewing angles is, therefore, redirected downwards towards nadir along vertical axis 144. This advantageously increases the illuminance of the work plane and simultaneously reduces the luminance of the luminaire at high viewing angles for all horizontal directions.

Figure 14:
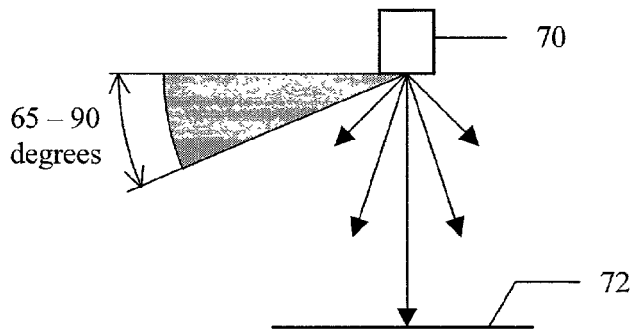
FIG. 14 illustrates for a ceiling-mounted luminaire the typical range of viewing angles over which designers attempt to minimize glare.

The fifth preferred embodiment (FIG. 19) is similar in concept to the second preferred embodiment (FIG. 16); the difference is that the linear or elliptical distributions of the radially oriented kinoform diffuser segments 152 provide more precisely controllable diffusion. In particular, the ability to limit diffusion to a specific vertical angle for each emitted ray 146 enables the design of luminaires whose luminous intensity distributions exhibit sharp cutoffs at high viewing angles (FIG. 14).

These advantages are most effectively realized with a linear distribution kinoform diffuser. However, an elliptical distribution kinoform diffuser may advantageously be used to generate a radially symmetric luminous intensity distribution for the luminaire that exhibits more moderate cutoff characteristics, as determined by its intended application.

Figure 17:
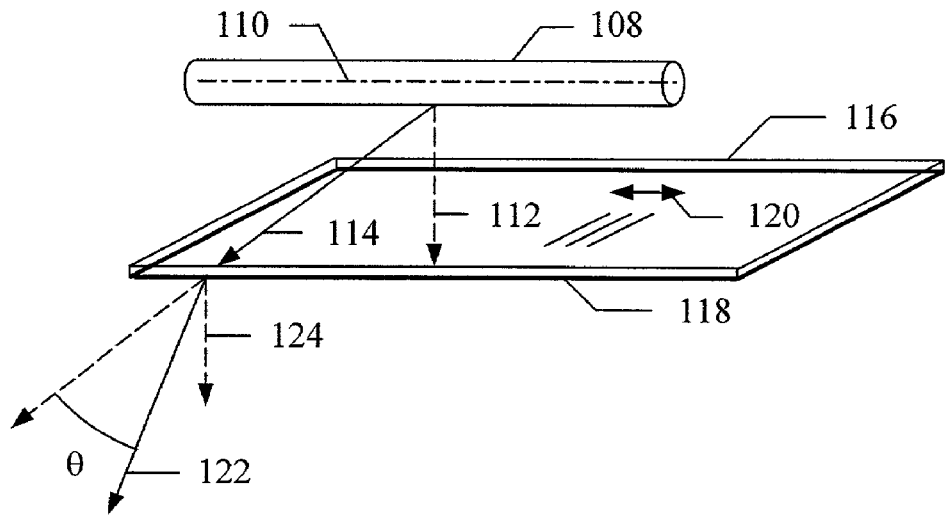
FIG. 17 illustrates a luminaire with a linear light source utilizing a linear or an elliptical distribution kinoform diffuser to minimize glare at high viewing angles in the vertical plane parallel to the light source axis.
Figure 20:
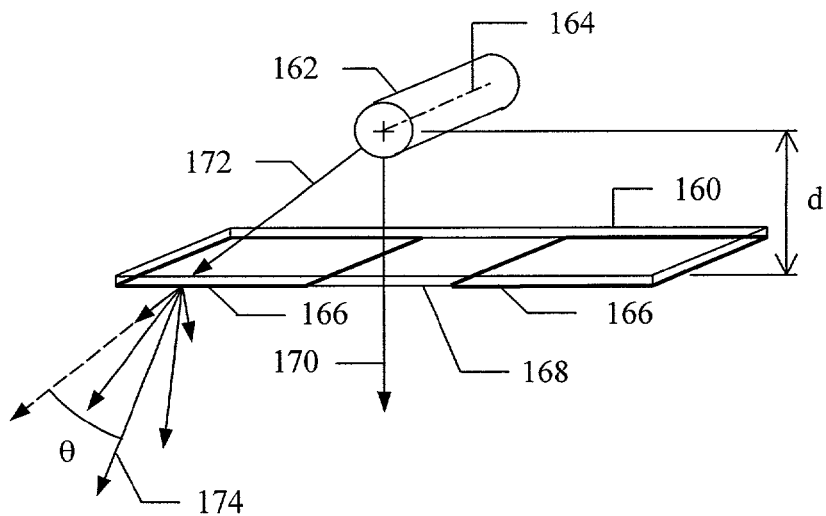
FIG. 20 illustrates a luminaire with a linear light source utilizing a kinoform diffuser with a transparent central region to provide a linear batwing luminous intensity distribution.

In a sixth preferred embodiment (FIG. 20), a transparent substrate 160 is positioned a distance d below a linear light source 162 having a major axis 164, with a kinoform diffuser 166 applied to the peripheral regions of substrate 160 on the side facing away from light source 162. A central region 168 is left unobstructed. Kinoform diffuser 166 may be oriented such that its plane of diffusion is parallel to major axis 164 of light source 162, as in the first preferred embodiment (FIG. 15), or perpendicular to the major axis, as in the third preferred embodiment (FIG. 17). Alternatively, a circular distribution kinoform diffuser may be employed.

A ray of light 170 emitted by light source 162 will pass through central region 168 of transparent substrate 160 without diffusion, while kinoform diffuser 166 will diffuse a ray of light 172 into the luminous flux distribution schematically indicated by a set of rays 174.

The sixth preferred embodiment (FIG. 20) is distinguished from the first (FIG. 15) and third (FIG. 17) preferred embodiments by the presence of transparent central region 168, which provides for greater control over the luminous intensity distribution of the luminaire without reducing the luminaire efficiency.

An additional advantage of the sixth preferred embodiment is that the luminous intensity distribution of the luminaire can be varied by changing the distance d from light source 162 to transparent substrate 160.

Figure 21:
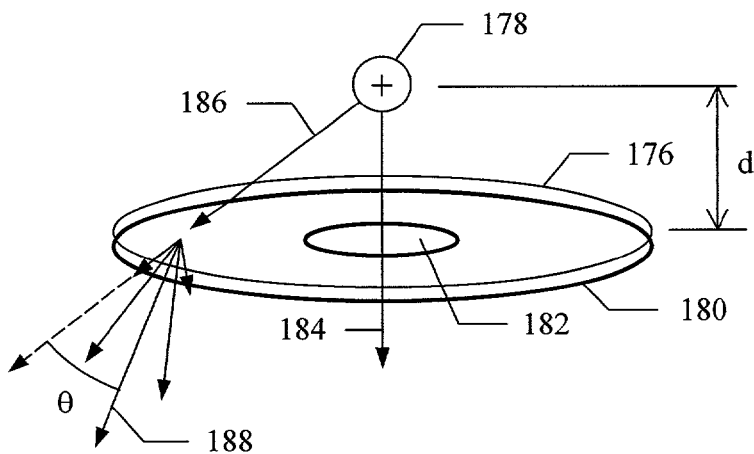
FIG. 21 illustrates a luminaire with a point light source utilizing a circular distribution kinoform diffuser with a transparent central region to provide a circular batwing luminous intensity distribution.

In a seventh preferred embodiment (FIG. 21), a transparent substrate 176 is positioned a distance d from a point light source 178, with a kinoform diffuser 180 applied to the peripheral regions of substrate 176 on the side facing away from light source 178. A central region 182 is left unobstructed. Kinoform diffuser 180 may be as disclosed in the second (FIG. 16), fourth (FIG. 18), or fifth (FIG. 19) preferred embodiments. The presence of transparent central region 182 provides for greater control over the luminous intensity distribution of the luminaire without reducing the luminaire efficiency.

A ray of light 184 emitted by light source 178 will pass through central region 182 of transparent substrate 176 without diffusion, while kinoform diffuser 180 will diffuse ray of light 186 into the luminous flux distribution schematically indicated by a set of rays 188.

Figure 22:
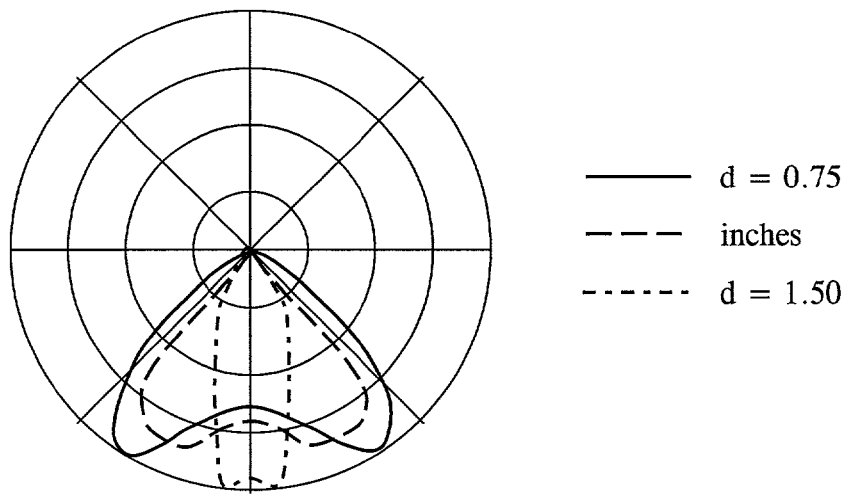
FIG. 22 illustrates the luminous intensity distribution provided by the luminaire shown in FIG. 21. The distribution varies with the distance d between the light source and the diffuser.

An additional advantage of the seventh preferred embodiment is that the luminous intensity distribution of the luminaire can be varied by changing the distance d from light source 178 to kinoform diffuser 180 (FIG. 22).

Figure 23A:
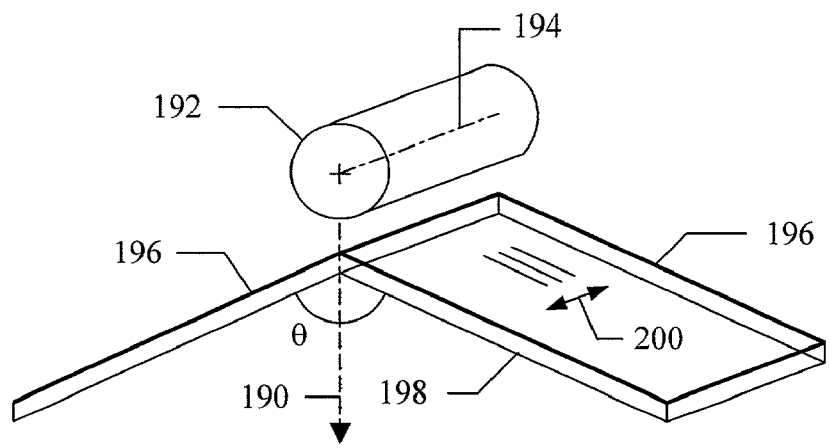
FIG. 23A illustrates a luminaire with a linear light source utilizing an inwardly folded linear distribution kinoform diffuser to provide a luminous intensity distribution with improved glare reduction at high viewing angles in all vertical planes.

In an eighth preferred embodiment (FIG. 23A), an inwardly folded transparent substrate 198 formed of two generally planar portions arranged in a V-shape is positioned below a linear light source 192 having a major axis 194, with linear or elliptical distribution kinoform diffuser portions 196 applied to either side of substrate 198. (The kinoform diffuser is shown on the side facing towards light source 192 for the purposes of illustration. This orientation offers better control of the photometric properties of the eighth preferred embodiment.) Kinoform diffuser portions 196 are oriented such that their planes of diffusion 200 are parallel to major axis 194 of light source 192.

Figure 23B:
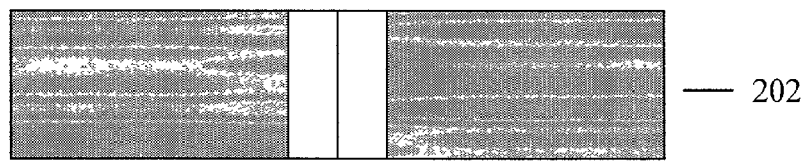
FIG. 23B illustrates the light source images seen through the luminaire shown in FIG. 23A for two different vertical viewing angles.
Figure 23B:
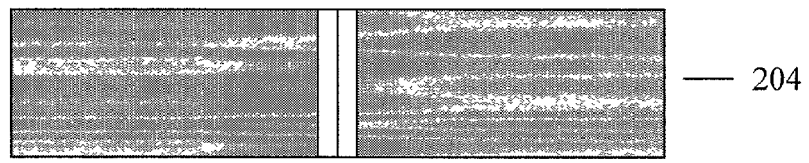

When the luminaire is viewed from nadir 190, the image of light source 192 appears normally as shown in schematic view 202 (FIG. 23B). However, when the luminaire is viewed at increasing angles in the vertical plane intersecting the major light source axis (by convention termed the 0-degree vertical plane), the image of light source 192 appears to decrease in width, as shown in schematic view 204 (FIG. 23B).

The light source image disappears at a view angle that is determined by the fold angle $\theta$, the off-axis transmission properties of kinoform diffuser 196, which side of the substrate 198 diffuser 196 is applied to, the length of substrate 198, and the distance from the luminaire to the viewer.

Figure 24:
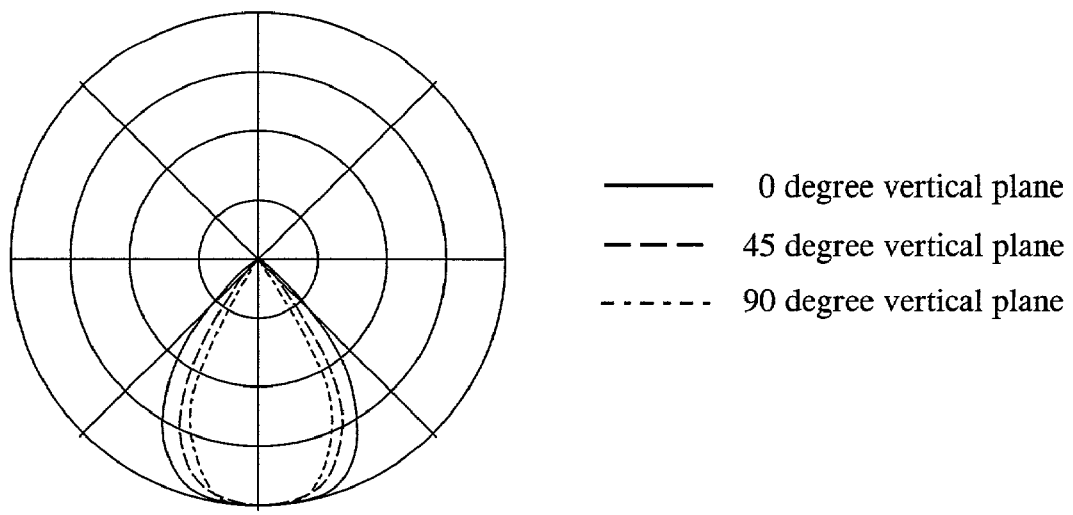
FIG. 24 illustrates the luminous intensity distribution provided by the luminaire shown in FIG. 23A. The zero-degree plane is parallel to the major axis of the light source.

An advantage of the eighth preferred embodiment is that the luminous intensity distribution of the luminaire has a sharp cutoff angle in all vertical planes (FIG. 24). (Skilled persons will appreciate that this advantage cannot be achieved in the 0-degree plane using conventional diffusers without the use of baffles or louvers.)

In a ninth preferred embodiment (FIG. 25A), an outwardly folded transparent substrate 212 formed of two generally planar portions arranged in a V-shape is positioned below a linear light source 208 having a major axis 210, with linear or elliptical distribution kinoform diffuser portions 214 applied to either side of substrate 212. (Kinoform diffuser portions 214 are shown on the side facing toward light source 208 for the purposes of illustration.) Kinoform diffuser portions 214 are oriented such that their planes of diffusion 206 are parallel to major axis 210 of light source 208.

Figure 25A:
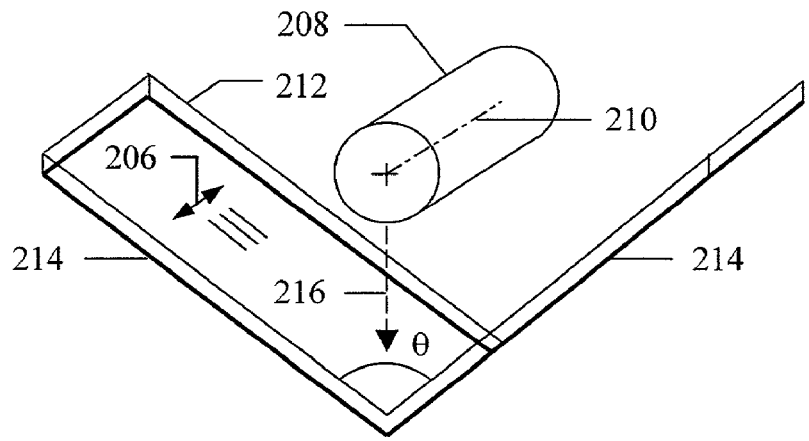
FIG. 25A illustrates a luminaire with a linear light source utilizing an outwardly folded linear distribution kinoform diffuser to provide a batwing luminous intensity distribution with improved glare reduction at high viewing angles in all vertical planes.
Figure 25B:
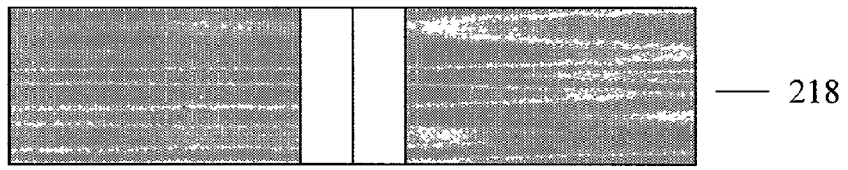
FIG. 25B illustrates the light source images seen through the luminaire shown in FIG. 25A for two different vertical viewing angles.
Figure 25B:
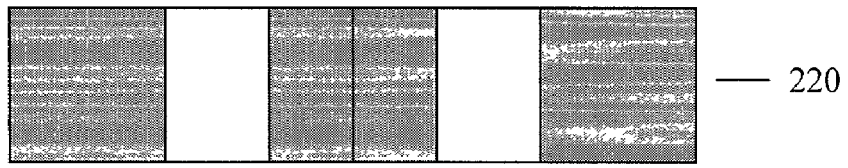

When the luminaire is viewed from nadir 216, the image of light source 208 appears normally as shown in schematic view 218 (FIG. 25B). However, when the luminaire is viewed at increasing angles in the 0-degree vertical plane, light source 208 appears to divide into two images, as shown in schematic view 220 (FIG. 25B).

The light source images disappear at a view angle that is determined by the fold angle θ, the off-axis transmission properties of kinoform diffuser 214, which side of the substrate 212 diffuser 214 is applied to, the length of substrate 212, and the distance from the luminaire to the viewer.

Figure 26:
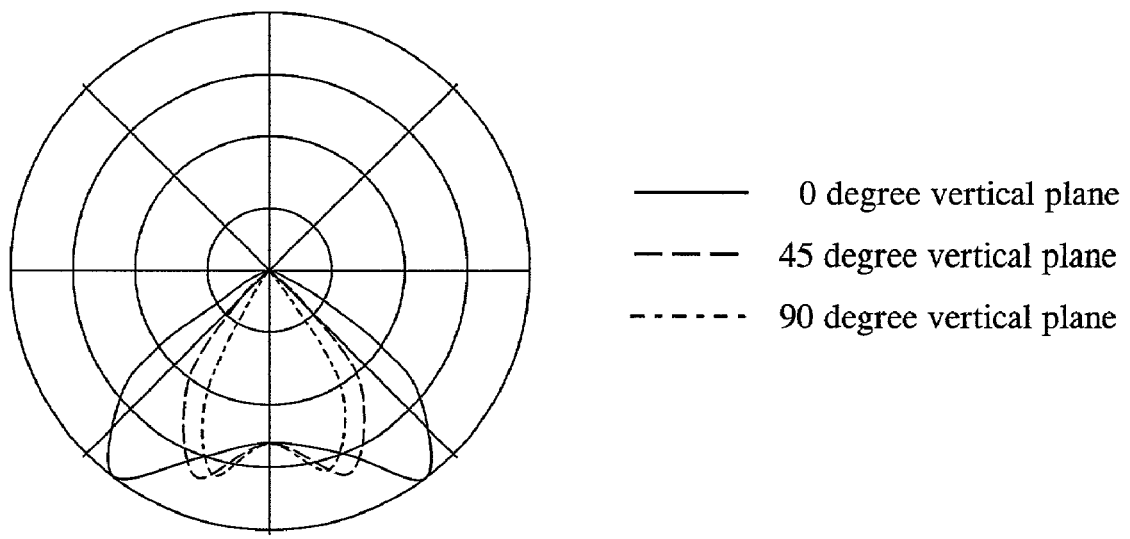
FIG. 26 illustrates the luminous intensity distribution provided by the luminaire shown in FIG. 25A. The zero-degree plane is parallel to the major axis of the light source.
Figure 27:
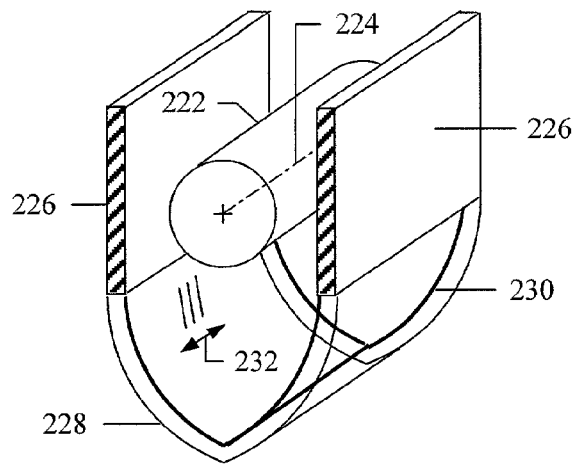
FIG. 27 illustrates a luminaire with a linear light source utilizing a linear distribution kinoform diffuser to provide a linear batwing luminous intensity distribution with improved glare reduction at high viewing angles in all vertical planes.

An advantage of the ninth preferred embodiment is that the luminous intensity distribution of the luminaire has a sharp cutoff angle in all vertical planes. Another advantage of the ninth preferred embodiment is that it provides a desirable batwing luminous intensity distribution in all vertical planes (FIG. 26) by providing two light source images. (Skilled persons will appreciate that this advantage cannot be achieved in the 0-degree plane using conventional diffusers without the use of baffles or louvers.) In a tenth preferred embodiment (FIG. 27), two curved transparent substrate portions 228 arranged in the general form of a U-shape are positioned below a linear light source 222 having a major axis 224. Opaque light shields 226 are positioned adjacent different ones of substrate portions 228 and on either side of light source 222, with linear or elliptical distribution kinoform diffuser portions 230 applied to substrate portions 228 on the sides facing towards light source 222. Diffuser portions 230 are oriented such that their planes of diffusion 232 is parallel to major axis 224 of light source 222.

Figure 28:
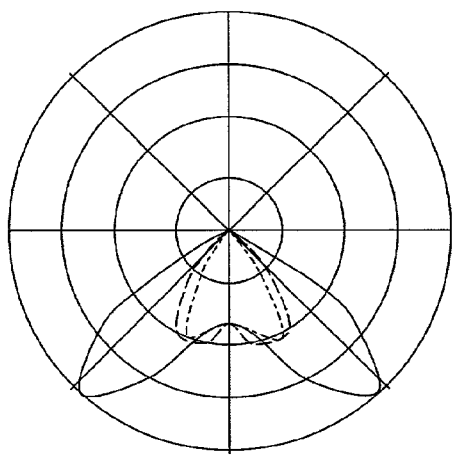
FIG. 28 illustrates the luminous intensity distribution provided by the luminaire shown in FIG. 27. The zero-degree plane is parallel to the major axis of the light source.

The advantages of the tenth preferred embodiment (FIG. 27) are the same as those of the ninth preferred embodiment (FIG. 25A). In addition, the curvatures of substrate portions 228 may be varied to provide further control over the luminous intensity distribution characteristics of the luminaire. In particular, they may be designed to produce a batwing luminous intensity distribution with an extremely sharp cutoff angle (FIG. 28).

In an eleventh preferred embodiment (FIG. 29), two generally planar transparent substrate portions 234 are positioned below a linear light source 236 having a major axis 238, with linear or elliptical distribution kinoform diffuser portions 240 applied to substrate portions 234 on the sides facing away from light source 236. Kinoform diffuser portions 240 are oriented such that their planes of diffusion are perpendicular to major axis 238 of light source 236.

In addition, two curved transparent substrate portions 244 arranged in the general form of a U-shape are positioned below light source 236, with a linear or an elliptical distribution kinoform diffuser portions 246 applied to substrate portions 244 on the sides facing towards light source 236. Kinoform diffuser portions 246 are oriented such that their planes of diffusion 248 are parallel to major axis 238 of light source 236.

The eleventh preferred embodiment (FIG. 29) combines the advantages of the sixth (FIG. 20) and tenth (FIG. 27) preferred embodiments.

Figure 30:
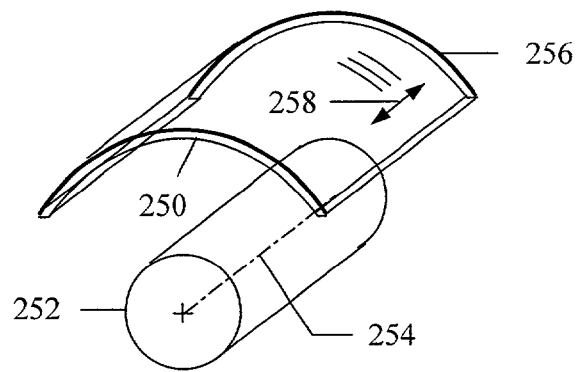
FIG. 30 illustrates a luminaire with a linear light source utilizing a curved linear distribution kinoform diffuser to provide a linear batwing luminous intensity distribution with elimination of lamp shadows.

In a twelfth preferred embodiment (FIG. 30), a curved transparent substrate 250 is positioned above a linear light source 252 having a major axis 254, with a linear or an elliptical distribution kinoform diffuser 256 applied to substrate 250 on the side facing away from light source 252. Kinoform diffuser 256 is oriented such that its plane of diffusion 258 is parallel to major axis 254 of light source 252.

Figure 31:
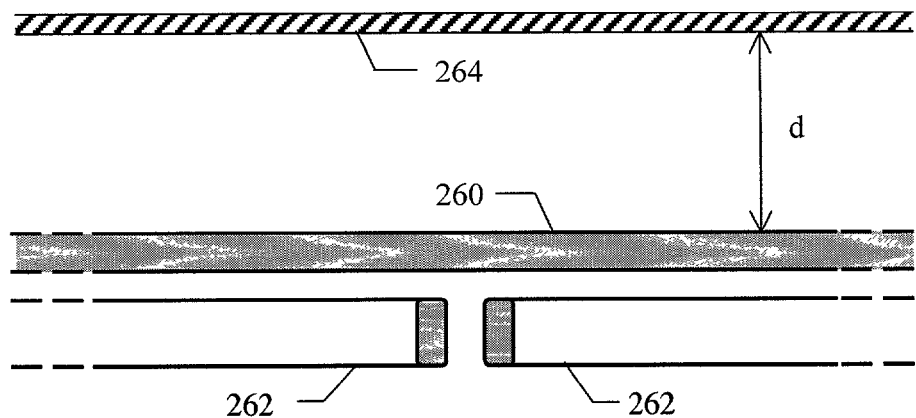
FIG. 31 illustrates the elimination of lamp socket shadows using a multiplicity of linear light sources with a common kinoform diffuser.

An advantage of the twelfth preferred embodiment is illustrated in FIG. 31, where a luminaire composed of a continuous length of kinoform diffuser 260 is positioned parallel to and above two linear fluorescent lamps 262, and located a distance d below a ceiling 264. The diffusion of light parallel to the light source axes eliminates the dark area (referred to as a "lamp socket shadow") on the ceiling directly above the lamp sockets that would result without kinoform diffuser 260.

In a thirteenth preferred embodiment (FIG. 32), a transparent substrate composed of two generally planar portions 266 separated by a generally centrally located curved portion 268 is positioned below a linear light source 270 having a longitudinal axis 272. A linear or an elliptical distribution kinoform diffuser 274 is applied to the substrate on the side facing away from light source 270. Kinoform diffuser 274 is oriented such that its plane of diffusion 276 is perpendicular to major axis 272 of light source 270.

Figure 29:
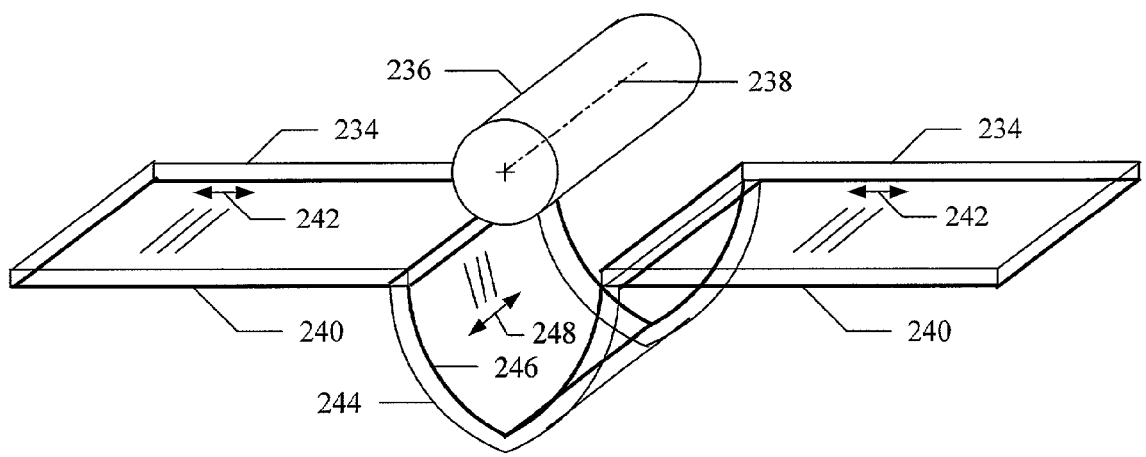
FIG. 29 illustrates a luminaire with a linear light source utilizing a linear distribution kinoform diffuser with a curved central region to provide a linear batwing luminous intensity distribution with improved glare reduction at high viewing angles in all vertical planes.

The advantages of the thirteenth preferred embodiment (FIG. 32) are the same as those of the eleventh preferred embodiment (FIG. 29).

Figure 33:
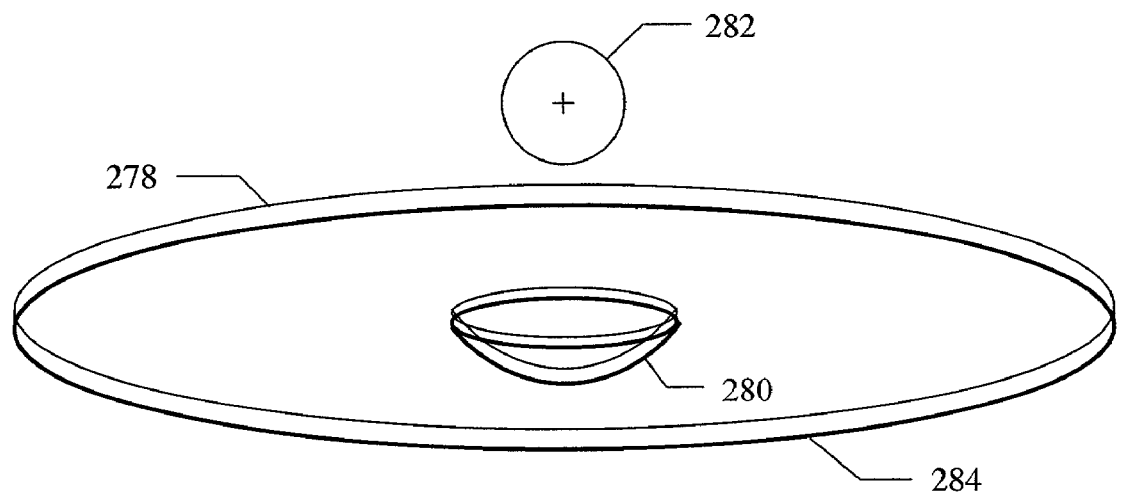
FIG. 33 illustrates a luminaire with a point light source utilizing a circular distribution kinoform diffuser with a curved central region to provide a circular batwing luminous intensity distribution with improved glare reduction at high viewing angles and light source image elimination from all viewing angles.

In a fourteenth preferred embodiment (FIG. 33), a transparent substrate composed of an annular generally planar section 278 and a generally centrally located radially curved section 280 is positioned below a point light source 282, with a circular distribution kinoform diffuser 284 applied to the substrate on the side facing away from light source 282.

Figure 32:
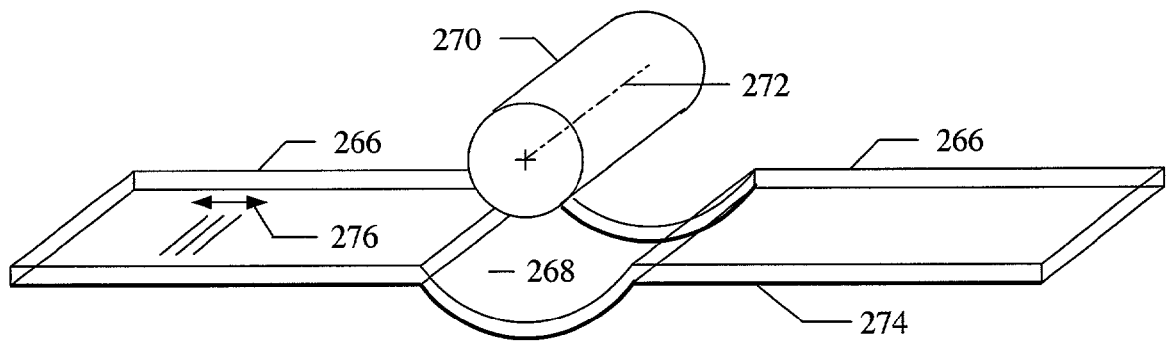
FIG. 32 illustrates a luminaire with a linear light source utilizing a linear or an elliptical distribution kinoform diffuser with a curved central region to provide a linear batwing luminous intensity distribution with improved glare reduction at high viewing angles in the vertical plane perpendicular to the light source axis and light source image elimination from all viewing angles.

The advantages of the fourteenth preferred embodiment (FIG. 33) are the same as those of the thirteenth preferred embodiment (FIG. 32).

Figure 8F:
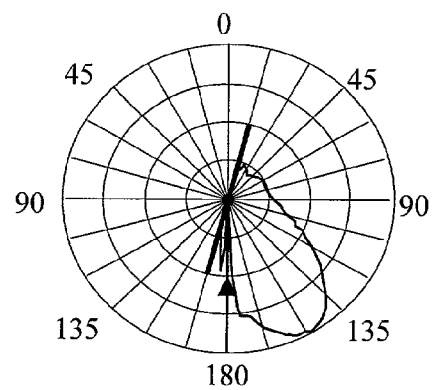
FIG. 8F show the off-axis retroreflectance of an incident beam with an incidence angle of 75 degrees.
Figure 9:
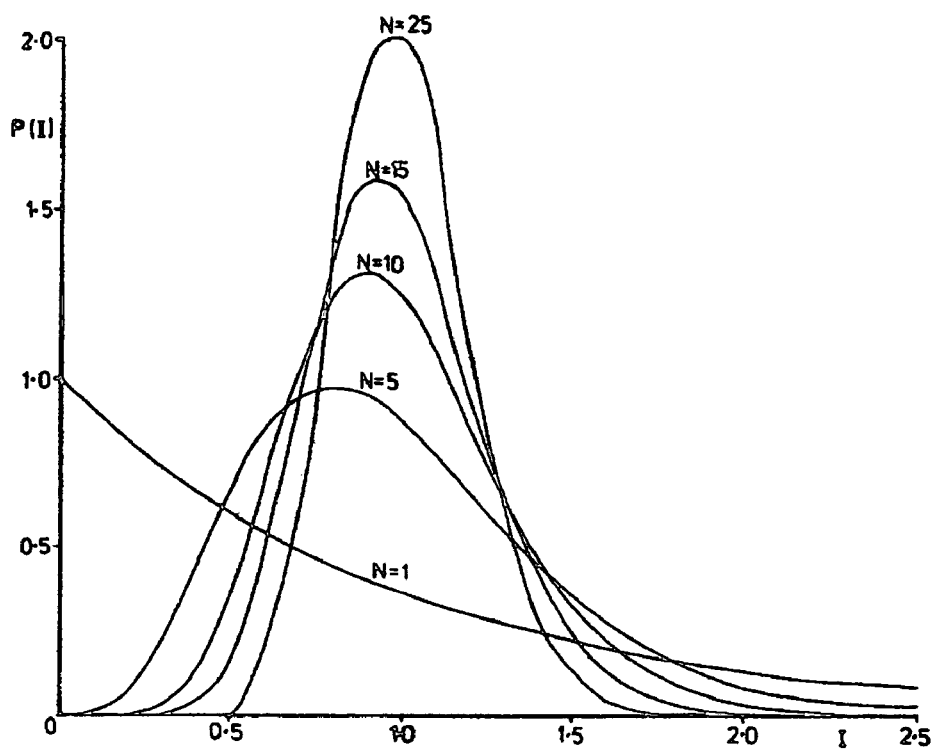
FIG. 9 shows the probability distribution of the summed laser speckle intensity as a function of N uncorrelated prior art laser speckle pattern exposures.

In a fifteenth preferred embodiment (FIG. 34), a reflective kinoform diffuser 290 with a linear or an elliptical distribution is positioned parallel to and above a major axis 288 of a linear light source 286. Diffuser 290 is oriented such that its plane of diffusion 292 is perpendicular to major axis 288 of light source 286. In accordance with the novel retroreflective diffusion properties of reflective kinoform diffusers as illustrated in FIG. 8F, a ray of incident light 294 emitted by light source 292 is diffused and preferentially redirected downwards in the direction indicated by a set of rays 296.

The advantage of the fifteenth preferred embodiment is that it provides a controlled luminous intensity distribution that cannot be achieved with conventional diffusers without the addition of lenses or curved reflectors.

Figure 35:
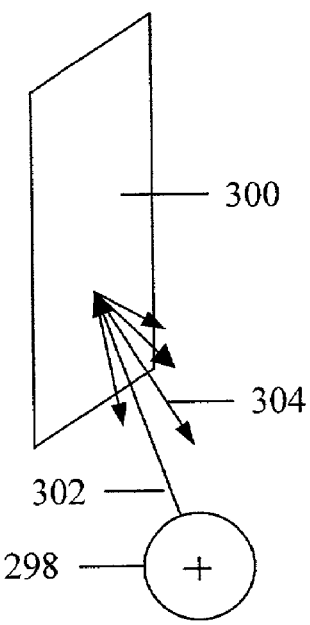

In a sixteenth preferred embodiment (FIG. 35), a reflective kinoform diffuser 300 with a circular distribution is positioned above a point light source 298 or, in the alternative, parallel to and above the major axis of a linear light source. In accordance with the novel retroreflective diffusion properties of reflective kinoform diffusers as illustrated in FIG. 8F, a ray of incident light 302 emitted by light source 298 is diffused and preferentially redirected downwards in the direction indicated by a set of rays 304.

Figure 34:
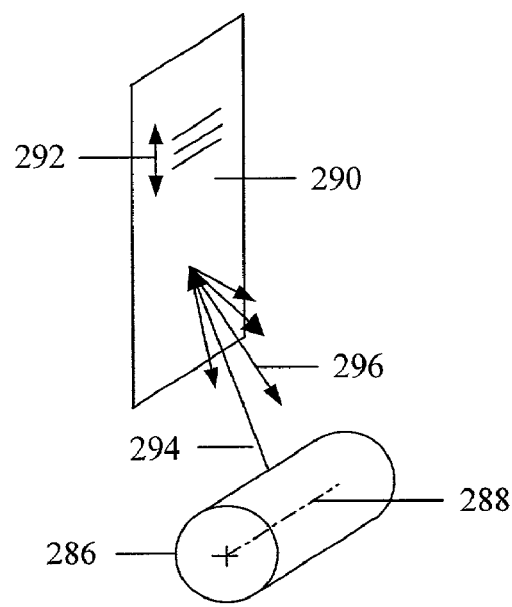
FIGS. 34 and 35 illustrate luminaires utilizing reflective kinoform diffusers of, respectively, a linear or an elliptical distribution type and a circular distribution type.

The advantages of sixteenth preferred embodiment (FIG. 35) are the same as those of the fifteenth preferred embodiment (FIG. 34).

Figure 36:
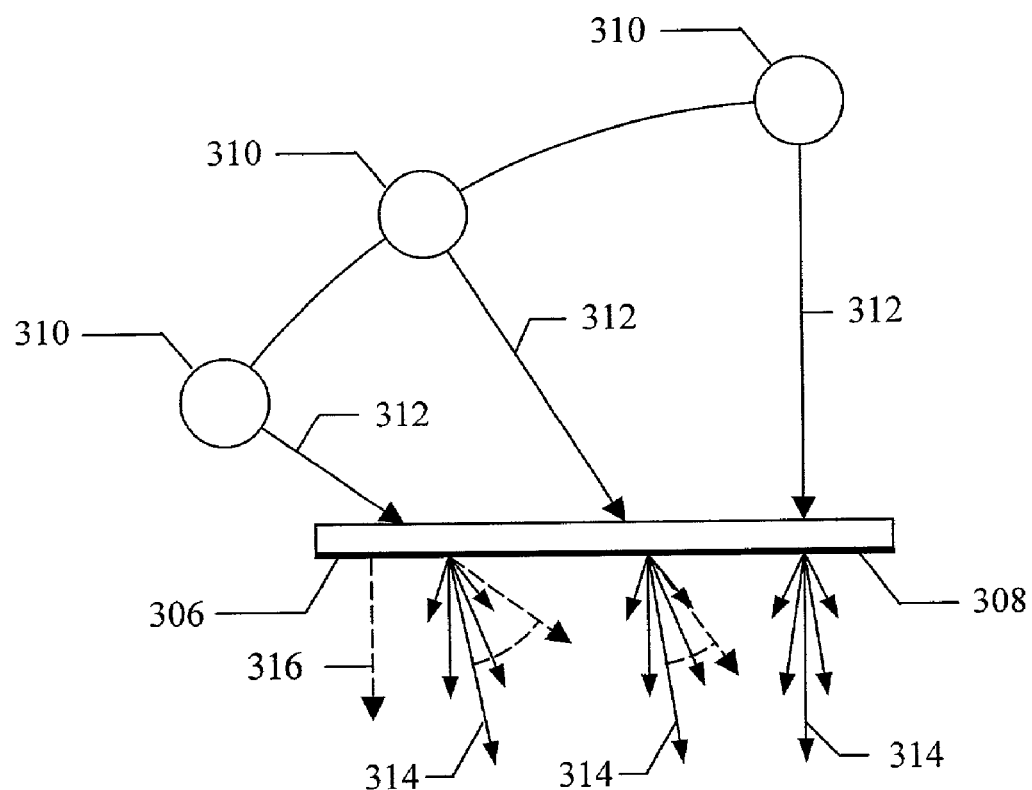
FIG. 36 illustrates a skylight or window utilizing a transmissive kinoform diffuser that performs the function of a motor-driven heliostat in the absence of active control devices.

In a seventeenth preferred embodiment (FIG. 36), a window or skylight composed of a transparent substrate 306 with a transmissive kinoform diffuser 308 on the lower surface is illuminated by direct sunlight as the sun 310 as it traverses the sky. In accordance with the novel diffusion characteristics of transmissive kinoform diffusers as illustrated in FIG. 8F, incident rays 312 of direct sunlight are preferentially diffused towards a diffuser surface normal or reference direction 316, as indicated by sets of rays 314.

An advantage of the seventeenth preferred embodiment is that direct sunlight is evenly diffused by kinoform diffuser 308. In accordance with the elimination of the zero-order beam, diffuser 308 exhibits an even luminance distribution across its surface. In particular, an image of the sun is not visible through diffuser 308, even as a blurred "hot spot."

A second advantage of the seventeenth preferred embodiment is that the preferential diffusion of the incident light 312 towards diffuser surface normal 316 improves the daylight utilization of the skylight or window, particularly when diffuser 308 is located at the top of a deep sky well. Skilled persons will appreciate that achieving such redirection of incident light using conventional light control devices requires motor-driven mirrors and heliostats.

A third advantage of the seventeenth preferred embodiment is that kinoform diffuser 308 may have a circular, elliptical, or linear distribution, according to the need to distribute the diffused sunlight in an isotropic or anisotropic diffusion pattern.

It will be obvious to those having skill in the art that many changes may be made to the details of the above-described preferred embodiments of the invention without departing from the underlying principles thereof. The scope of the present invention should, therefore, be determined only by the following claims.

The invention claimed is:

1. A surface relief optical diffuser, comprising:
   an optically diffusing layer having a light entrance major surface and a light exit major surface, the light entrance major surface constructed to diffuse light incident on the light entrance major surface at an angle of incidence measured relative to an entrance surface normal; and
   a microscopic surface relief pattern formed as the light entrance major surface of the optically diffusing layer and including multiple light scattering elements having surfaces on each of which are one or more sub-elements, the light scattering elements in response to incident light producing diffused light formed in a light beam pattern having a batwing luminous intensity distribution, the diffused light produced by the light scattering elements propagating through the optically diffusing layer and out of the light exit major surface.

2. The optical diffuser of claim 1, in which the microscopic surface relief pattern is formed in a photosensitive recording medium.

3. The optical diffuser of claim 1, in which the microscopic surface relief pattern is a single laser speckle pattern.

4. The optical diffuser of claim 1, in which the microscopic surface relief pattern is multiple spatially autocorrelated laser speckle patterns.

5. The optical diffuser of claim 4, in which the multiple spatially autocorrelated laser speckle patterns cooperate such that there is no perceptible undiffused light component propagating from the exit surface.

6. The optical diffuser of claim 1, in which the microscopic surface relief pattern produces the batwing luminous intensity distribution within a specified range of angles.

7. The optical diffuser of claim 6, in which the microscopic surface relief pattern exhibits negligible scattering of incident light outside of the specified range of angles.

8. The optical diffuser of claim 1, in which the microscopic surface relief pattern is in the form of pebbles, pits, or corrugations.

9. The optical diffuser of claim 1, further comprising a substantially optically transparent protective layer covering the microscopic surface relief pattern.

10. The optical diffuser of claim 1, in which the microscopic surface relief pattern is recorded in a holographic recording medium.

11. The optical diffuser of claim 1, in which the microscopic surface relief pattern is of a kinoform type.

\* \* \* \* \*

UNITED STATES PATENT AND TRADEMARK OFFICE
CERTIFICATE OF CORRECTION

PATENT NO. : 7,660,039 B2 Page 1 of 1
APPLICATION NO. : 09/907536
DATED : February 9, 2010
INVENTOR(S) : Santoro et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 219 days.

Signed and Sealed this

Twenty-eighth Day of December, 2010

David J. Kappos
*Director of the United States Patent and Trademark Office*